(12) United States Patent
Hwang et al.

(10) Patent No.: US 11,464,039 B2
(45) Date of Patent: Oct. 4, 2022

(54) METHOD FOR TRANSMITTING AND RECEIVING PHYSICAL SIGNALS AND/OR CHANNELS IN WIRELESS COMMUNICATION SYSTEM AND APPARATUS THEREFOR

(71) Applicant: LG Electronics Inc., Seoul (KR)

(72) Inventors: Seunggye Hwang, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/025,244

(22) Filed: Sep. 18, 2020

(65) Prior Publication Data

US 2021/0007127 A1 Jan. 7, 2021

Related U.S. Application Data

(63) Continuation of application No. PCT/KR2019/003516, filed on Mar. 26, 2019.

(30) Foreign Application Priority Data

Mar. 26, 2018 (KR) .......................... 10-2018-0034467
Sep. 21, 2018 (KR) .......................... 10-2018-0114501
Nov. 2, 2018 (KR) .......................... 10-2018-0133995

(51) Int. Cl.
*H04W 4/00* (2018.01)
*H04W 72/12* (2009.01)
(Continued)

(52) U.S. Cl.
CPC ....... *H04W 72/1289* (2013.01); *H04L 1/0071* (2013.01); *H04L 1/1812* (2013.01); *H04L 5/0055* (2013.01)

(58) Field of Classification Search
USPC .... 370/229, 230, 230.1, 252, 328, 329, 330, 370/341, 343, 345, 431, 436, 458, 468,
(Continued)

(56) References Cited

U.S. PATENT DOCUMENTS

2003/0083070 A1* 5/2003 Ishikawa ............. H04W 52/247
455/436
2010/0278109 A1* 11/2010 Papasakellariou .... H04L 5/0053
370/328

(Continued)

FOREIGN PATENT DOCUMENTS

WO WO2016170430 10/2016

OTHER PUBLICATIONS

ZTE :"Consideration on timing relationship for 2 HARQ processes for NB-IoT," 3GPP TSG RAN WG1 Meeting #87, R1-1612600, Reno, USA Nov. 14-18, 2016 (Year: 2016).*

(Continued)

*Primary Examiner* — Nguyen H Ngo
(74) *Attorney, Agent, or Firm* — Fish & Richardson P.C.

(57) ABSTRACT

The present specification provides a method for transmitting and receiving physical signals and/or channels in a wireless communication system and an apparatus therefor. Specifically, a method for a terminal to receive a wireless signal and/or a channel in a wireless communication system may comprise the steps of: receiving, from a base station, downlink control information (DCI) for scheduling for one or more wireless signals and/or channels; and cross-receiving the one or more wireless signals and/or channels on a sub-block basis from the base station on the basis of the DCI.

9 Claims, 34 Drawing Sheets

(51) Int. Cl.
*H04L 1/00* (2006.01)
*H04L 1/18* (2006.01)
*H04L 5/00* (2006.01)

(58) Field of Classification Search
USPC .......................................................... 370/498
See application file for complete search history.

(56) References Cited

U.S. PATENT DOCUMENTS

| | | | |
|---|---|---|---|
| 2011/0034177 A1* | 2/2011 | Oh .................... | H04W 72/0453 455/450 |
| 2013/0336201 A1* | 12/2013 | Nishio ................ | H04L 1/0073 370/315 |
| 2014/0126386 A1* | 5/2014 | Beale .................. | H04L 5/0092 370/252 |
| 2015/0256403 A1 | 9/2015 | Li et al. | |
| 2016/0095076 A1* | 3/2016 | Xiong ................ | H04W 56/002 370/336 |
| 2016/0309475 A1* | 10/2016 | Wong ....................... | H04W 4/70 |
| 2017/0063503 A1* | 3/2017 | Liu ........................ | H04L 5/0051 |
| 2017/0202008 A1* | 7/2017 | Nader .................... | H04L 1/1896 |
| 2018/0034604 A1 | 2/2018 | Alvarino et al. | |
| 2018/0049006 A1 | 2/2018 | Hong et al. | |
| 2018/0083736 A1* | 3/2018 | Manolakos ........ | H03M 13/2707 |
| 2018/0367202 A1* | 12/2018 | Yang ..................... | H04L 1/0071 |
| 2019/0020506 A1* | 1/2019 | Cheng ................. | H04L 1/1819 |
| 2019/0045533 A1* | 2/2019 | Chatterjee ......... | H04W 72/0446 |
| 2019/0104503 A1* | 4/2019 | Niu ....................... | H04L 5/0048 |
| 2019/0222363 A1* | 7/2019 | Mu ........................... | H04L 1/16 |
| 2019/0296809 A1* | 9/2019 | Li ........................ | H04B 7/0456 |
| 2020/0029314 A1* | 1/2020 | Niu ....................... | H04L 5/0007 |
| 2020/0106557 A1* | 4/2020 | Wong ...................... | H04L 1/08 |
| 2020/0288479 A1* | 9/2020 | Xi ........................... | H04B 7/02 |
| 2020/0322979 A1* | 10/2020 | Chatterjee ......... | H04W 72/0446 |
| 2020/0351062 A1* | 11/2020 | Yi .......................... | H04L 5/0037 |
| 2021/0168844 A1* | 6/2021 | Takeda ................. | H04L 5/0078 |

OTHER PUBLICATIONS

LG Electronics, "Discussion on common aspects in TDD NB-IoT," R1-1802179, 3GPP TSG RAN WG1 Meeting 92, Athens, Greece, dated Feb. 26-Mar. 2, 2018, 13 pages.

PCT International Search Report in International Application No. PCT/KR2019/003516, dated Jul. 11, 2019, 15 pages (with English translation).

ZTE, Sanechips, "Summary of DL aspects for TDD NB-IoT," R1-1802998, 3GPP TSG RAN WG1 Meeting #92, Athens, Greece, dated Feb. 26-Mar. 2, 2018, 14 pages.

Ericsson, "HARQ-ACK bundling for FeMTC," R1-1611099, Presented at 3GPP TSG-RAN WG1 meeting #87, Reno, Nevada, USA, Nov. 14-18, 2016, 7 pages.

Intel Corporation, "Further details on PDSCH for MTC," R1-155300, Presented at 3GPP TSG RAN WG1 Meeting #82bis, Malmö, Sweden, Oct. 5-9, 2015, 7 pages.

Intel Corporation, "Remaining details of HARQ-ACK bundling," R1-1702152, Presented at 3GPP TSG RAN WG1 Meeting #88, Athens, Greece Feb. 13-17, 2017, 8 pages.

Intel Corporation, "Timing Relationships for NB-IoT," R1-160417, 3GPP TSG RAN WG1 Meeting #84, St Julian's, Malta, Feb. 15-19, 2016, 5 pages.

LG Electronics, "Discussion on multiple transport blocks scheduling in NB-IoT," R1-1810242, Presented at 3GPP TSG RAN WG1 Meeting #94bis, Chengdu, China, Oct. 8-12, 2018, 5 pages.

Marvell, "Number of HARQ Processes When in Coverage Enhancement," R1-154476, Presented at 3GPP TSG RAN WG1 Meeting #82, Beijing, Aug. 24-28, 2015, 8 pages.

Office Action in Japanese Appln. No. 2020-572367, dated Oct. 19, 2021, 6 pages (with English translation).

* cited by examiner

In-band system

Guard-band system

Stand-alone system

METHOD FOR TRANSMITTING AND RECEIVING PHYSICAL SIGNALS AND/OR CHANNELS IN WIRELESS COMMUNICATION SYSTEM AND APPARATUS THEREFOR

CROSS-REFERENCE TO RELATED APPLICATIONS

This application is a continuation of International Application No. PCT/KR2019/003516, filed on Mar. 26, 2019, which claims the benefit of Korean Application No. 10-2018-0133995, filed on Nov. 2, 2018, Korean Application No. 10-2018-0114501, filed on Sep. 21, 2018, and Korean Application No. 10-2018-0034467, filed on Mar. 26, 2018. The disclosures of the prior applications are incorporated by reference in their entirety.

TECHNICAL FIELD

The present disclosure relates to a wireless communication system, and more specifically relates to a method of performing a transmission or reception of a transport block and/or a hybrid automatic repeat request (HARD) operation, in consideration of repeated transmissions of a physical signal and/or channel, and an apparatus therefor.

BACKGROUND

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

SUMMARY

An object of the present disclosure is to provide a method of transmitting and receiving physical channels and/or signals in a wireless communication system and apparatus therefor.

Specifically, the present disclosure proposes a method of performing a transmission or reception of a transport block and/or a hybrid automatic repeat request (HARQ) operation when physical channels and/or signals are repeatedly transmitted, and apparatus therefor.

Particularly, the present disclosure proposes a method for improving the efficiency of transmitting physical channels and/or signals when a multi-TB transmission and/or multiple HARQ processes are scheduled.

It will be appreciated by persons skilled in the art that the objects that could be achieved with the present disclosure are not limited to what has been particularly described hereinabove and the above and other objects that the present disclosure could achieve will be more clearly understood from the following detailed description.

A method of receiving a radio signal and/or channel by a user equipment in a wireless communication system in accordance with an embodiment of the present disclosure may comprise receiving, from a base station, downlink control information (DCI) for scheduling one or more radio signals and/or channels; and performing an interleaved-reception (or cross-reception) of the one or more radio signals and/or channels on a sub-block basis.

Further, the method in accordance with an embodiment of the present disclosure may further comprise receiving sub-block-related information for the one or more radio signals and/or channels from the base station, and the interleaved-reception on the sub-block basis may be performed based on the sub-block-related information and the DCI.

Further, the method in accordance with an embodiment of the present disclosure may further comprise feeding back ACK information for a specific radio signal and/or channel to the base station when a reception of the specific radio signal and/or channel among the one or more radio signals and/or channels is completed; and performing an interleaved-reception of remaining radio signals and/or channels other than the specific radio signal and/or channel on the sub-block basis when the feedback of the ACK information is present.

A user equipment of receiving a radio signal and/or channel in a wireless communication system in accordance with an embodiment of the present disclosure may comprise a radio frequency (RF) unit for transmitting and receiving a radio signal; and a processor functionally connected to the RF unit, wherein the processor may control receiving, from a base station, downlink control information (DCI) for scheduling one or more radio signals and/or channels; and performing an interleaved-reception (or cross-reception) of the one or more radio signals and/or channels on a sub-block basis from the base station based on the DCI.

Further, in the user equipment in accordance with an embodiment of the present disclosure, the processor may control receiving sub-block-related information for the one or more radio signals and/or channels from the base station, and the interleaved-reception on the sub-block basis may be performed based on the sub-block-related information and the DCI.

Further, in the user equipment in accordance with an embodiment of the present disclosure, the processor may control feeding back ACK information for a specific radio signal and/or channel to the base station when a reception of the specific radio signal and/or channel among the one or more radio signals and/or channels is completed; and performing an interleaved-reception of remaining radio signals and/or channels other than the specific radio signal and/or channel on the sub-block basis from the base station when the feedback of the ACK information is present.

A method of transmitting a radio signal and/or channel by a base station in a wireless communication system in accordance with an embodiment of the present disclosure may comprise transmitting, to a user equipment, downlink control information (DCI) for scheduling one or more radio signals and/or channels; and performing an interleaved-transmission (or cross-transmission) of the one or more radio signals and/or channels on a sub-block basis.

Further, the method in accordance with an embodiment of the present disclosure may further comprise transmitting sub-block-related information for the one or more radio signals and/or channels to the user equipment, and the interleaved-transmission on the sub-block basis may be performed based on the sub-block-related information and the DCI.

Further, the method in accordance with an embodiment of the present disclosure may further comprise, when receiving ACK information indicating that a reception of a specific radio signal and/or channel among the one or more radio signals and/or channels is completed, performing an interleaved-transmission of remaining radio signals and/or channels other than the specific radio signal and/or channel on the sub-block basis to the user equipment.

A base station of transmitting a radio signal and/or channel in a wireless communication system in accordance with an embodiment of the present disclosure may comprise a radio frequency (RF) unit for transmitting and receiving a radio signal; and a processor functionally connected to the RF unit, wherein the processor may control transmitting, to a user equipment, downlink control information (DCI) for scheduling one or more radio signals and/or channels; and performing an interleaved-transmission (or cross-transmission) of the one or more radio signals and/or channels on a sub-block basis to the user equipment based on the DCI.

Further, in the base station in accordance with an embodiment of the present disclosure, the processor may control transmitting sub-block-related information for the one or more radio signals and/or channels to the user equipment, and the interleaved-transmission on the sub-block basis may be performed based on the sub-block-related information and the DCI.

Further, in the base station in accordance with an embodiment of the present disclosure, the processor may control, when receiving ACK information indicating that a reception of a specific radio signal and/or channel among the one or more radio signals and/or channels is completed, performing an interleaved-transmission of remaining radio signals and/or channels other than the specific radio signal and/or channel on the sub-block basis to the user equipment.

According to the present disclosure, transmit diversity and/or time diversity may be achieved by an interleaved transmission/reception (a cross-transmission/reception) of physical signals and/or channels It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION

In the following, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)

Figure 1:
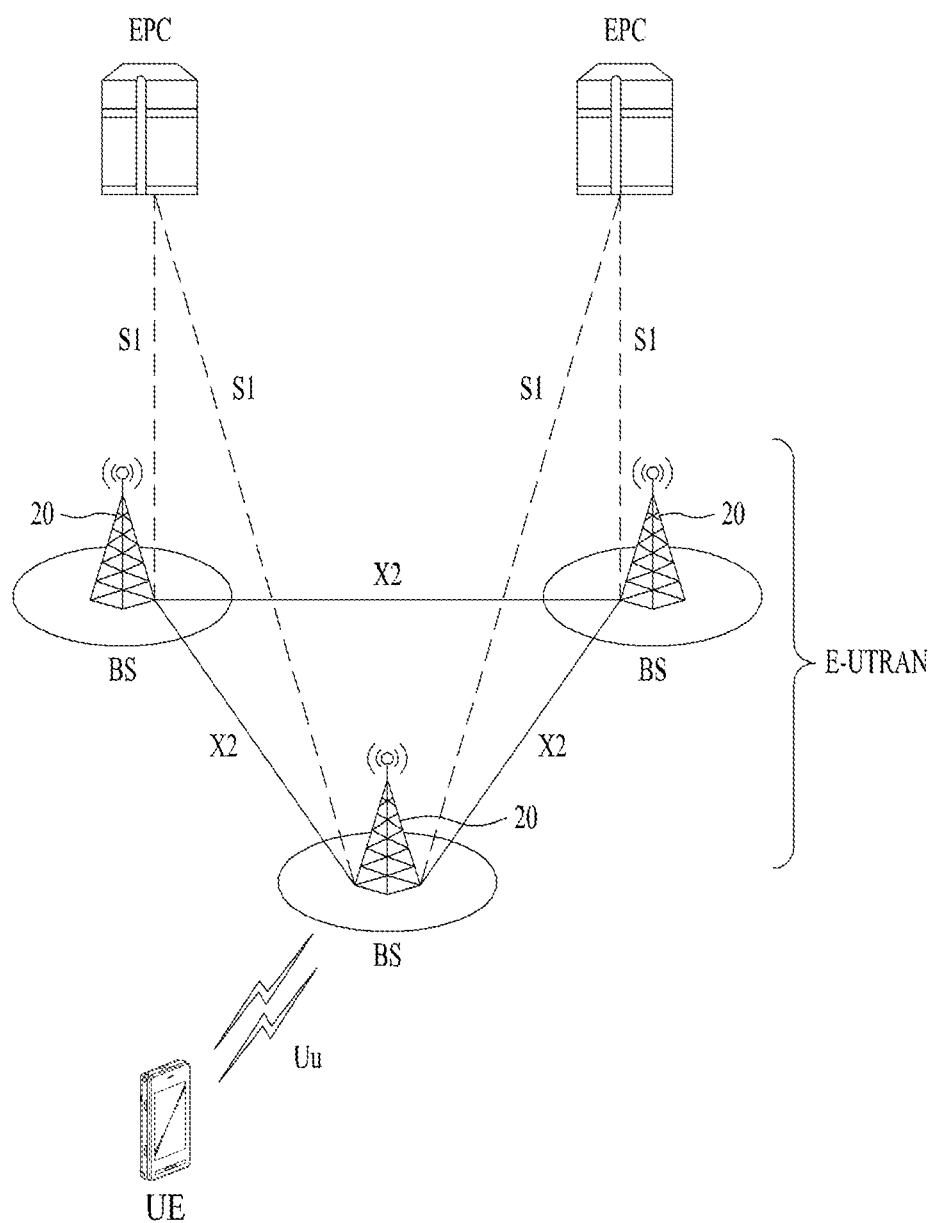
FIG. 1 illustrates an example of the 3GPP LTE system architecture.

3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification A. System Architecture FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one base station (BS) 20 that provides control and user planes to a user equipment (UE) 10. The UE 10 may be fixed or mobile. The UE 10 may be referred to as another terminology such as 'mobile station (MS)', 'user terminal (UT)', 'subscriber station (SS)', 'mobile terminal (MT)', or 'wireless device'. In general, the BS 20 may be a fixed station that communicates with the UE 10. The BS 20 may be referred to as another terminology such as 'evolved Node-B (eNB)', 'general Node-B (gNB)', 'base transceiver system (BTS)', or 'access point (AP)'. The BSs 20 may be interconnected through an X2 interface. The BS 20 may be connected to an evolved packet core (EPC) through an S1 interface. More particularly, the BS 20 may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the BS and UE may exchange an RRC message through the RRC layer.

Figure 2:
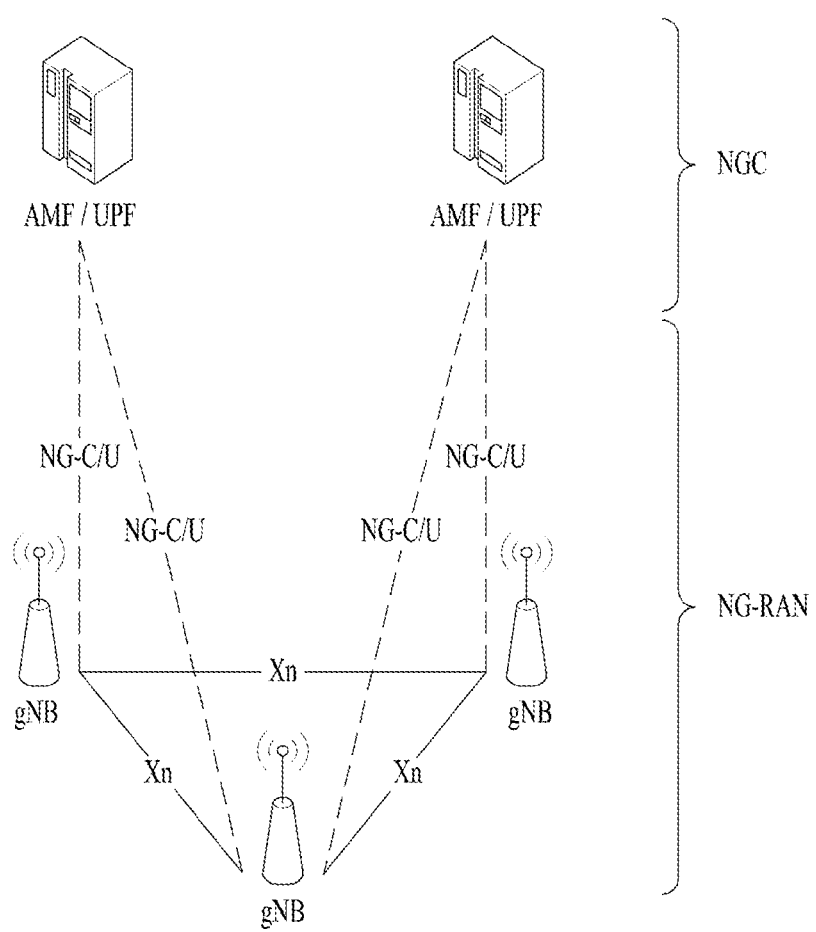
FIG. 2 illustrates an example of the 3GPP NR system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structure

Hereinafter, an LTE frame structure will be described.

In the LTE standards, the sizes of various fields in the time domain are expressed in a time unit ($T_s=1/(15000 \times 2048)$ seconds) unless specified otherwise. DL and UL transmissions are organized in radio frames, each of which has a duration of 10 ms ($Tf=307200 \times Ts=10$ ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f=307200 \cdot T_s=10$ ms and is composed of 20 slots, each of which has a length of $T_{slot}=15360 \cdot T_s=0.5$ ms. The 20 slots are indexed from 0 to 19. A subframe is composed of two consecutive slots. That is, subframe i is composed of slot 2i and slot (2i+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

Figure 3:
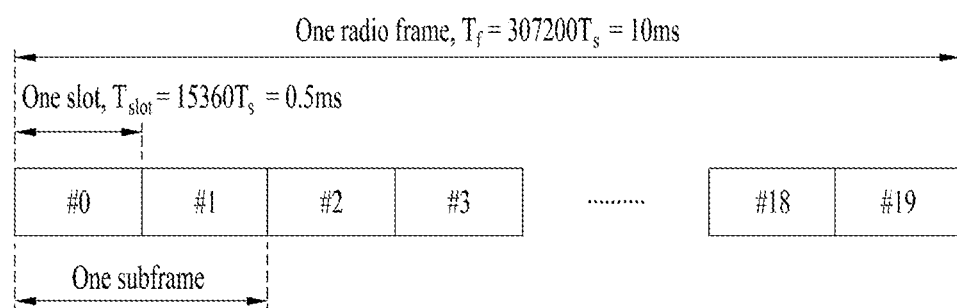
FIG. 3 illustrates a radio frame structure of frame structure type 1.

FIG. 3 illustrates a radio frame structure of frame structure type 1.

Referring to FIG. 3, the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f = 307200 \times T_s = 10$ ms and includes two half-frames, each of which has a length of $15360 \cdot T_s = 0.5$ ms. Each half-frame includes five subframes, each of which has a length of $30720 \cdot T_s = 1$ ms Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to 30720 $T_s = 1$ ms. Subframe i is composed of two slots, slot 2i and slot (2i+1), each of which has a length of $T_{slot} = 15360 \cdot T_s = 0.5$ ms.

Figure 4:
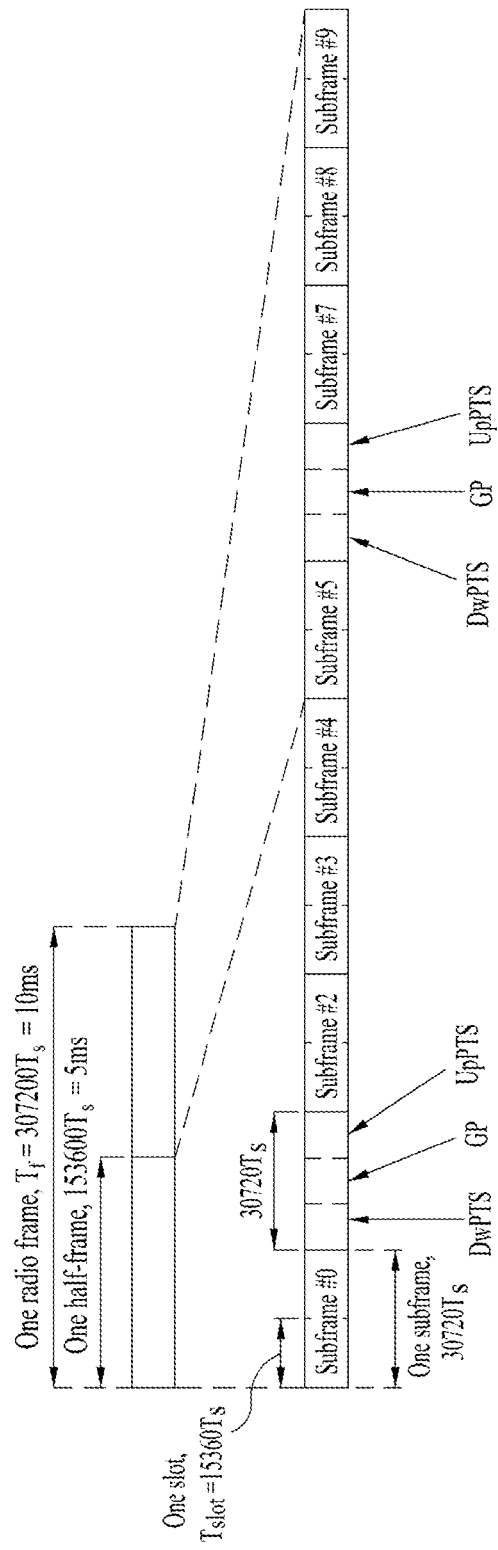
FIG. 4 illustrates a radio frame structure of frame structure type 2.

FIG. 4 illustrates a radio frame structure of frame structure type 2.

FIG. 4 shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 5:
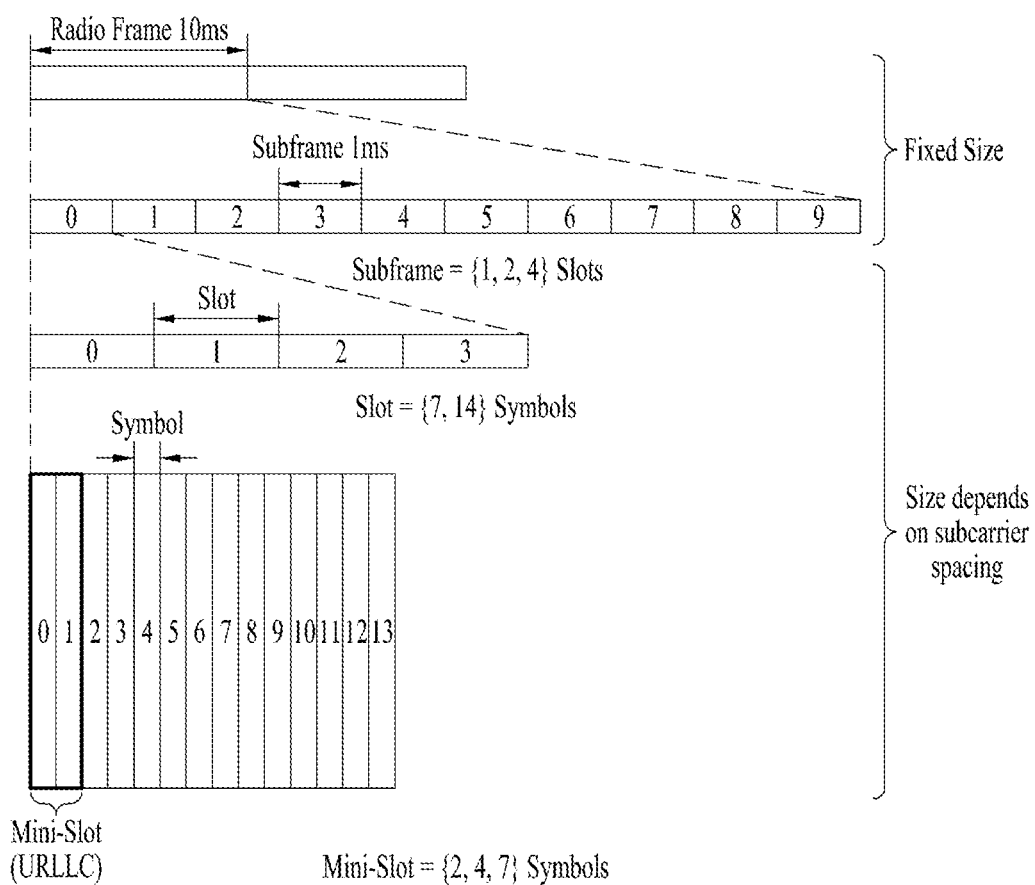
FIG. 5 illustrates an example of a frame structure in NR.

FIG. 5 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or p). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s = 1/(\Delta f_{max} \cdot N_r)$. In this case $\Delta f_{max} = 480 \cdot 10^3$ and $N_f = 4096$. Downlink and uplink transmissions are configured in a radio frame having a duration of $T_f = (\Delta f_{max} N_f / 100) \cdot T_s = 10$ ms. The radio frame is composed of 10 subframes, each having a duration of $T_{sf} = (\Delta f_{max} N_f / 1000) \cdot T_s = 1$ ms. In this case, there may be a set of uplink frames and a set of downlink frames. Transmission of an uplink frame with frame number i from a UE needs to be performed earlier by $T_{TA} = N_{TA} T_s$ than the start of a corresponding downlink frame of the UE. Regarding the numerology μ, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$ One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($s_{symb}^{slot}$) the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 shows an example of μ=2, i.e., 60 kHz subcarrier spacing (SCS). Referring to Table 2, one subframe may include four slots. FIG. 5 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

C. Physical Resource

Figure 6:
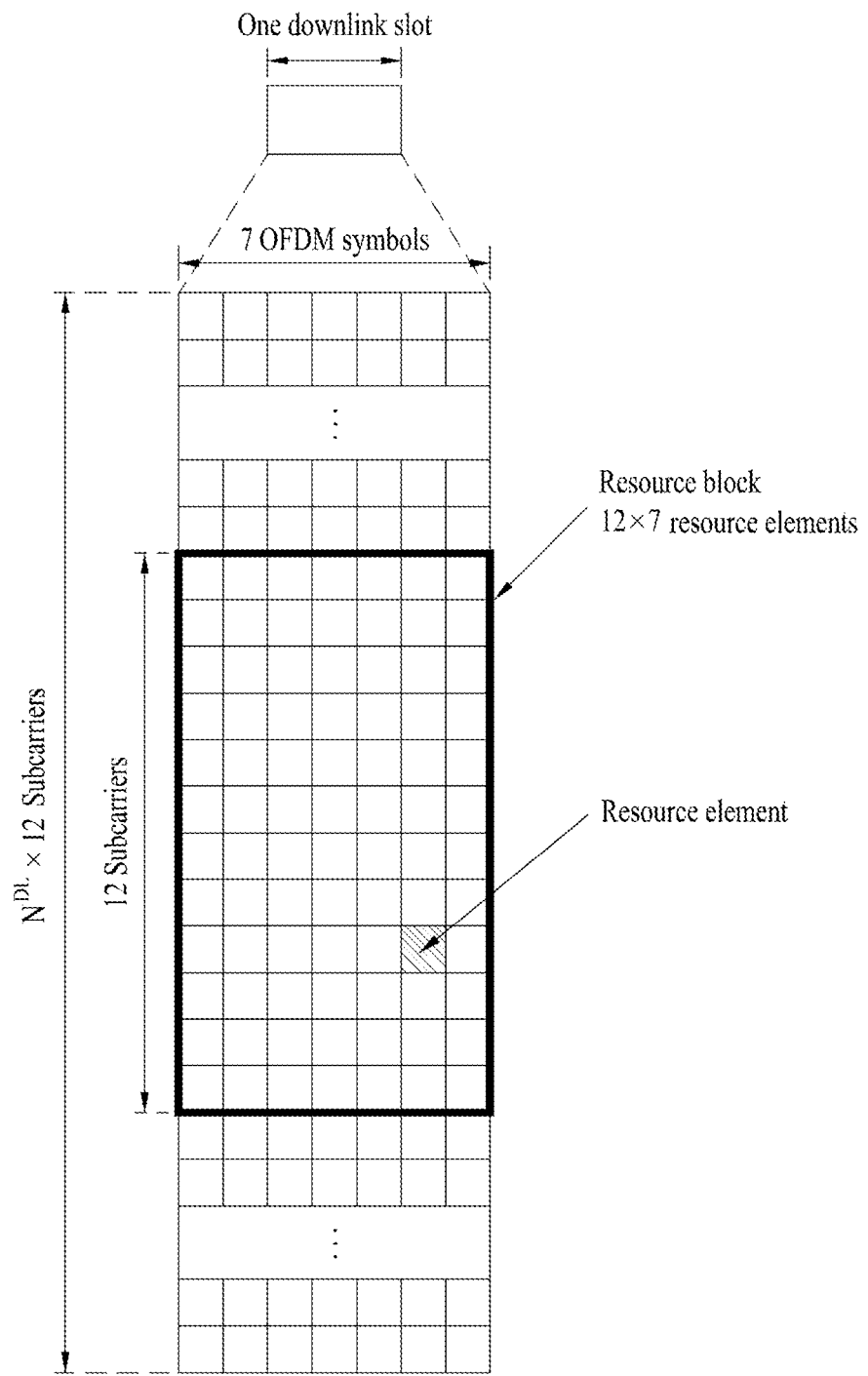
FIG. 6 illustrates a resource grid for one DL slot.

FIG. 6 illustrates a resource grid for one downlink slot.

Referring to FIG. 6, a downlink slot includes a plurality of OFDM symbols in the time domain. One downlink slot includes 7 OFDM symbols in the time domain, and a resource block (RB) for example includes 12 subcarriers in the frequency domain. However, the present disclosure is not limited thereto. Each element of the resource grid is referred to as a resource element (RE). One RB includes 12×7 REs. The number of RBs in the downlink slot depends on a downlink transmission bandwidth. An uplink slot may have the same structure as the downlink slot.

Figure 7:
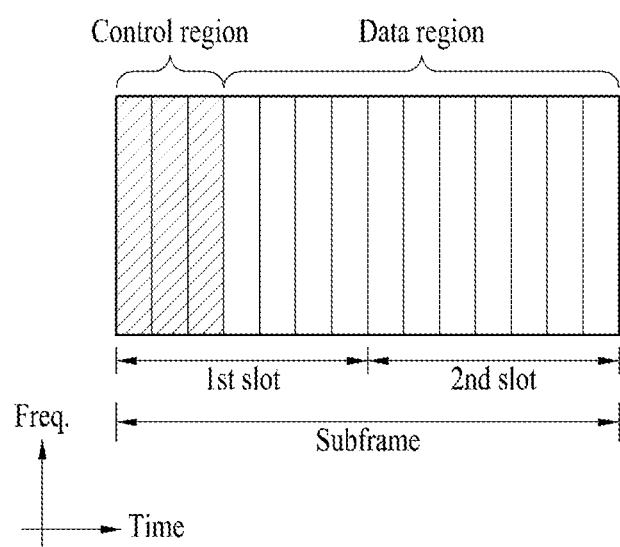
FIG. 7 illustrates the structure of a downlink subframe.

FIG. 7 illustrates the structure of a downlink subframe.

Referring to FIG. 7, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARD) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 8:
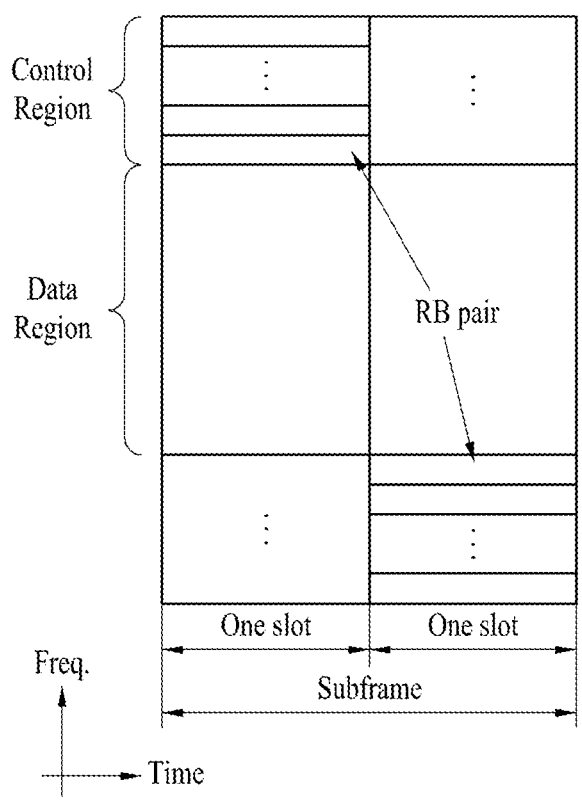
FIG. 8 illustrates the structure of an uplink subframe.

FIG. 8 illustrates the structure of an uplink subframe.

Referring to FIG. 8, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 9:
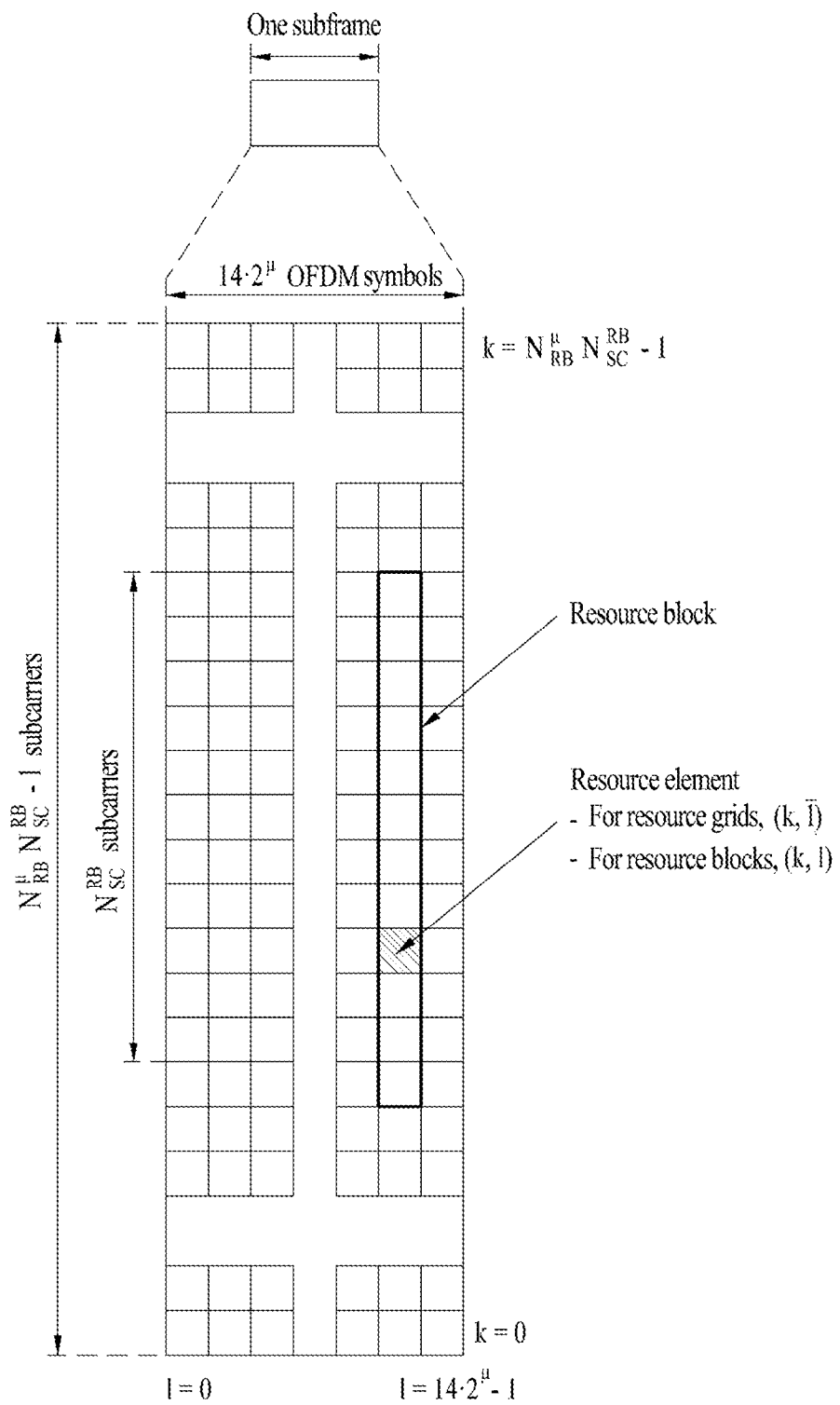
FIG. 9 illustrates an example of a resource grid in NR.

FIG. 9 illustrates an example of a resource grid in NR.

Referring to the resource grid of FIG. 9, there are $N_{RB}^{\mu}N_{sc}^{RB}$ subcarriers in the frequency domain, and there are $14 \cdot 2^\mu$ OFDM symbols in one subframe. However, the resource grid is merely exemplary and the present disclosure is not limited thereto. In the NR system, a transmitted signal is described by one or more resource grids, each including $N_{RB}^{\mu}N_{sc}^{RB}$ subcarriers, and $2^\mu N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 9, one resource grid may be configured for each numerology $\mu$ and antenna port p. Each element of the resource grid for the numerology $\mu$ and antenna port p is referred to as a resource element, and it is uniquely identified by an index pair (k,$\bar{l}$), where k is an index in the frequency domain (k=0, . . . , $N_{RB}^{\mu}N_{sc}^{RB}-1$) and $\bar{l}$ denotes the location of a symbol in the subframe ($\bar{l}$=0, . . . , $2^\mu N_{symb}^{(\mu)}-1$). The resource element (k,$\bar{l}$) for the numerology $\mu$ and antenna port p corresponds to a complex value $a_{k,\bar{l}}^{(p,\mu)}$. When there is no risk of confusion or when a specific antenna port or numerology is not specified, the indexes p and $\mu$ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. Offset- ToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration P.

The center of subcarrier 0 of common resource block 0 for the SCS configuration P is equivalent to point A.

The relation between a common RB number $r_{CRB}^{\mu}$ in the frequency domain and a resource element (k,l) for the SCS configuration μ is determined as shown in Equation 1.

$$n_{CRB}^{\mu} = \left\lfloor \frac{k}{N_{sc}^{RB}} \right\rfloor \quad \text{Equation 1}$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \quad \text{Equation 2}$$

In Equation 2, $N_{BWP,i}^{start}$ is a common resource block where the BWP starts relative to common resource block 0.

Figure 10:
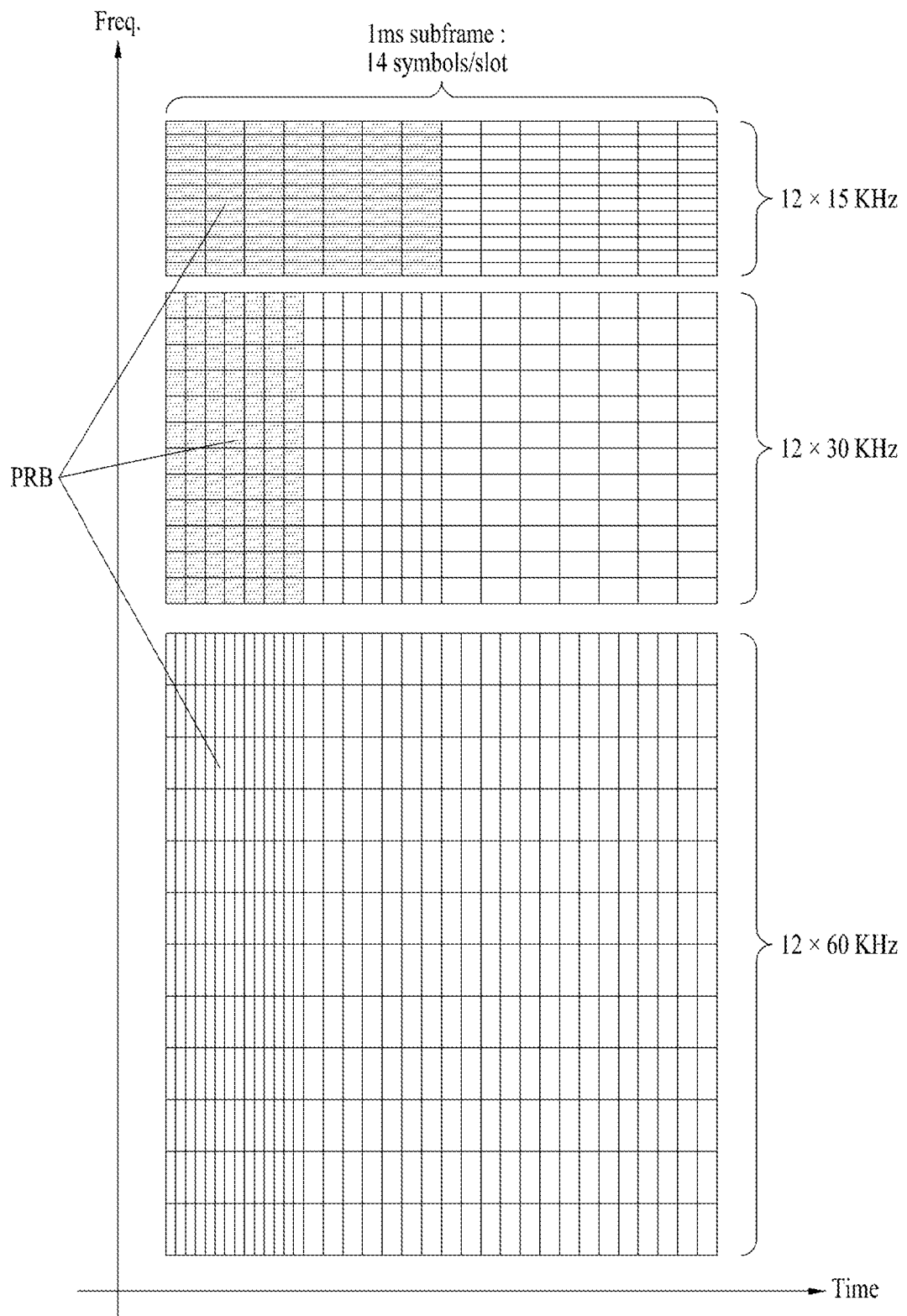
FIG. 10 illustrates an example of a physical resource block in NR.

FIG. 10 illustrates an example of a physical resource block in NR.

D. Wireless Communication Devices

Figure 11:
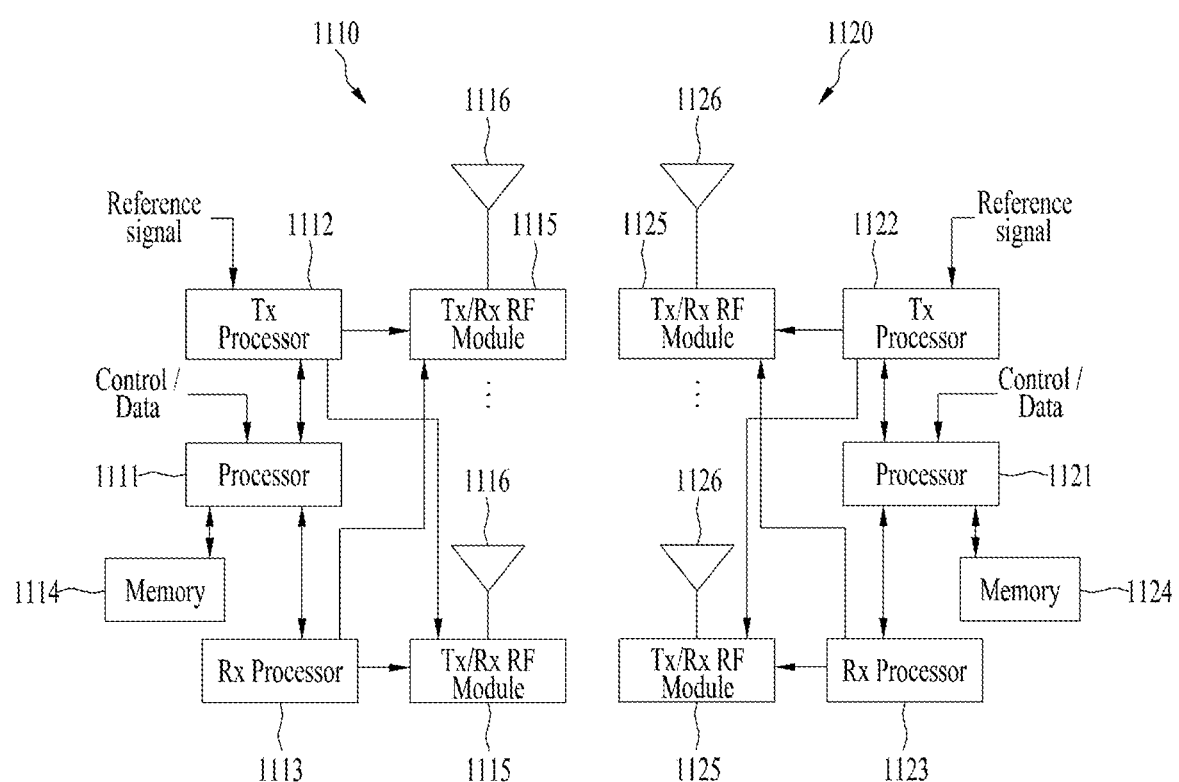
FIG. 11 illustrates a block diagram of a wireless communication apparatus to which the methods proposed in the present disclosure are applicable.

FIG. 11 illustrates a block diagram of a wireless communication apparatus to which the methods proposed in the present disclosure are applicable.

Referring to FIG. 11, a wireless communication system includes a base station 1110 and multiple UEs 1120 located within coverage of the base station 1110. The base station 1110 and the UE may be referred to as a transmitter and a receiver, respectively, and vice versa. The base station 1110 includes a processor 1111, a memory 1114, at least one transmission/reception (Tx/Rx) radio frequency (RF) module (or RF transceiver) 1115, a Tx processor 1112, an Rx processor 1113, and an antenna 1116. The UE 1120 includes a processor 1121, a memory 1124, at least one Tx/Rx RF module (or RF transceiver) 1125, a Tx processor 1122, an Rx processor 1123, and an antenna 1126. The processors are configured to implement the above-described functions, processes and/or methods. Specifically, the processor 1111 provides a higher layer packet from a core network for downlink (DL) transmission (communication from the base station to the UE). The processor implements the functionality of layer 2 (L2). In downlink (DL), the processor provides the UE 1120 with multiplexing between logical and transmission channels and radio resource allocation. That is, the processor is in charge of signaling to the UE. The Tx processor 1112 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with a reference signal (RS) in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 1116 through the Tx/Rx module (or transceiver) 1115. Each Tx/Rx module may modulate an RF carrier with each spatial stream for transmission. At the UE, each Tx/Rx module (or transceiver) 1125 receives a signal through each antenna 1126 thereof. Each Tx/Rx module recovers information modulated on the RF carrier and provides the information to the RX processor 1123. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the base station. Such soft decisions may be based on channel estimation values. The soft decisions are decoded and deinterleaved to recover data and control signals originally transmitted by the base stationover the physical channel. The corresponding data and control signals are provided to the processor 1121.

Uplink (UL) transmission (communication from the UE to the base station) is processed by the base station 1110 in a similar way to that described in regard to the receiver functions of the UE 1120. Each Tx/Rx module (or transceiver) 1125 receives a signal through each antenna 1126. Each Tx/Rx module provides an RF carrier and information to the Rx processor 1123. The processor 1121 may be connected to the memory 1124 storing program codes and data. The memory may be referred to as a computer-readable medium.

E. Machine Type Communication (MTC)

The Machine Type Communication (MTC) refers to communication technology adopted by 3$^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as 'eMTC', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC Operates Only in a Specific System Bandwidth (or Channel Bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding the smallest system bandwidth in Tables 6 and 7 as in the legacy LTE. Alternatively, the MTC may operate in at least one BWP or in a specific band of a BWP.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 shows the frequency ranges (FRs) defined for the NR.
Table 5

TABLE 5

| Frequency range designation | Corresponding frequency range |
|---|---|
| FR1 | 450 MHz–6000 MHz |
| FR2 | 24250 MHz–52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 12A:
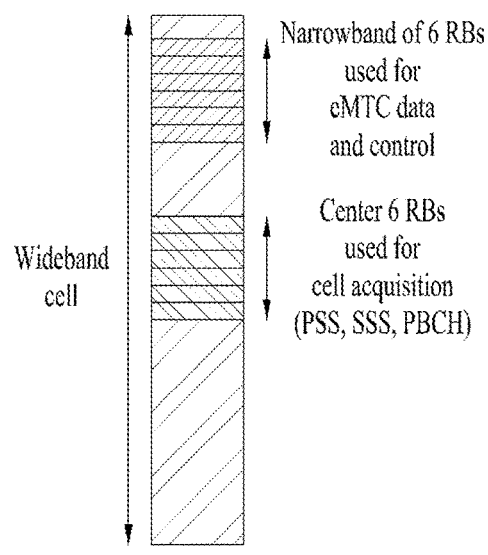
FIGS. 12A and 12B illustrate examples of narrowband operations and frequency diversity.
Figure 12B:
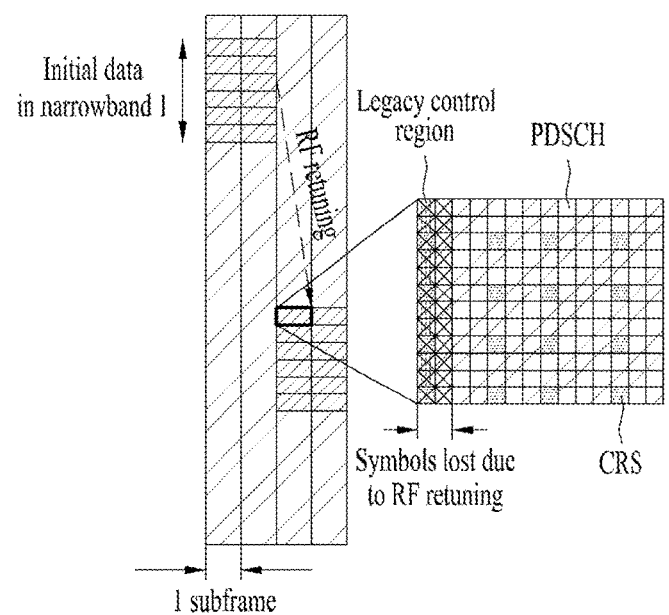

FIGS. 12A and 12B illustrate examples of narrowband operations and frequency diversity.

Specifically, FIG. 12A illustrates an example of the narrowband operation, and FIG. 12B illustrates an example of repetitions with RF retuning.

Hereinafter, frequency diversity by RF retuning will be described with reference to FIG. 12B.

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 13:
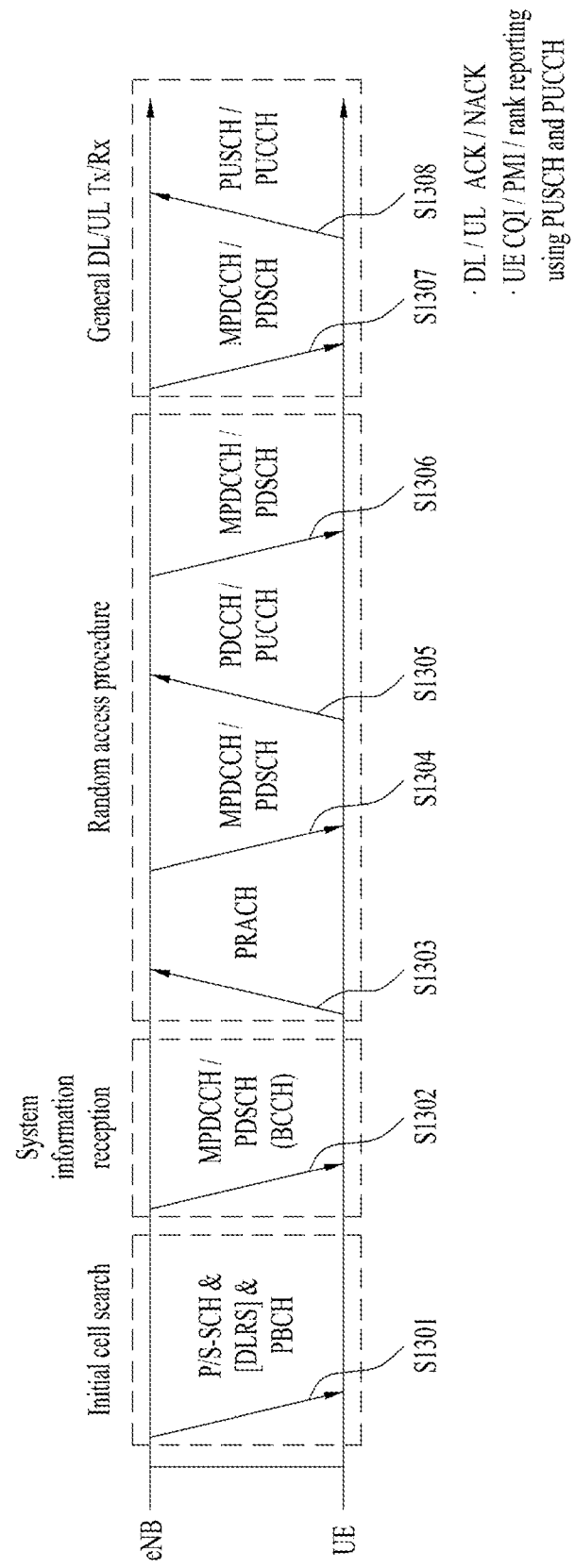
FIG. 13 illustrates physical channels available in MTC and a general signal transmission method using the same.

FIG. 13 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figures 14A, 14B:
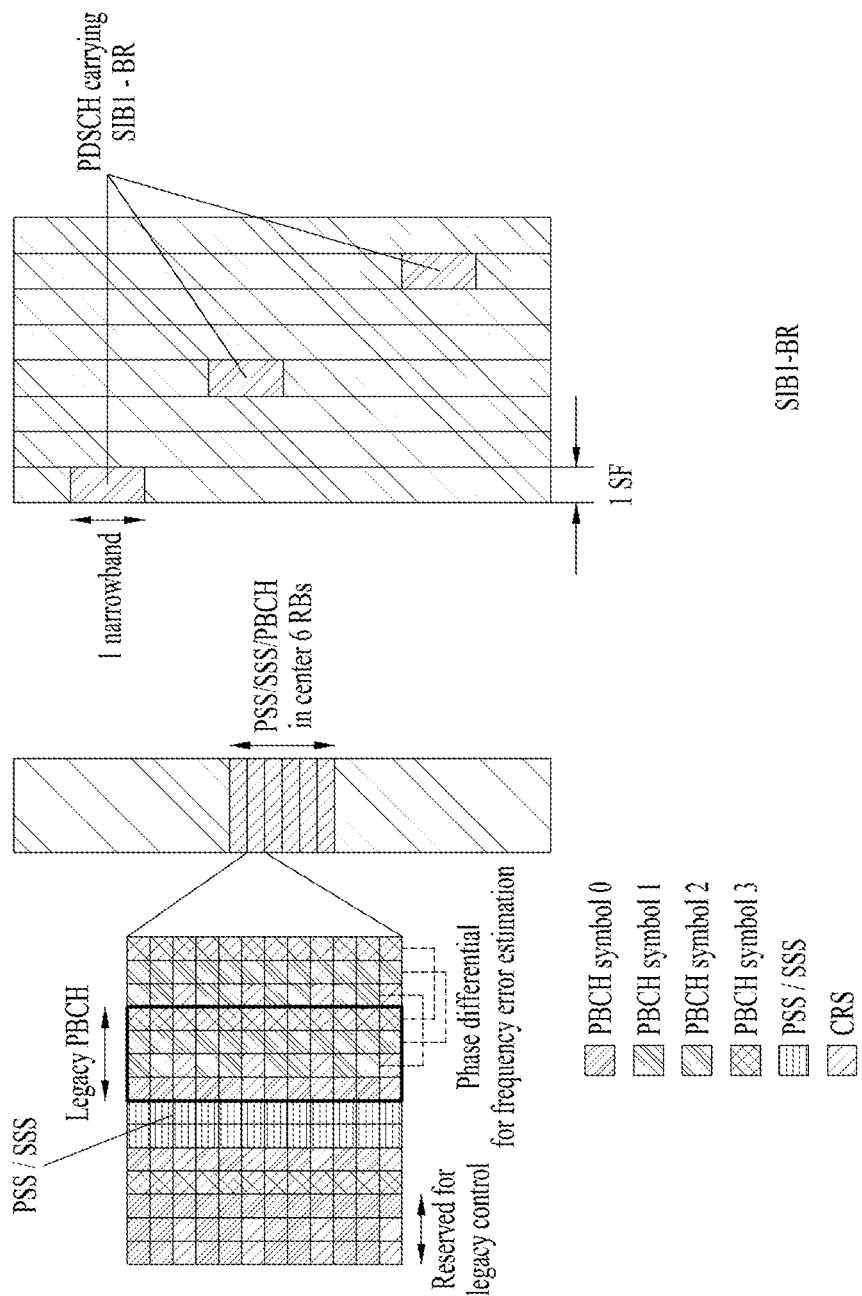
FIGS. 14A and 14B illustrate an example of system information transmissions in MTC.

FIGS. 14A and 14B illustrate an example of system information transmissions in MTC.

Specifically, FIG. 14A illustrates an example of a repetition pattern for subframe #0 in FDD and a frequency error estimation method for a normal CP and repeated symbols, and FIG. 14B illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

| -- ASN1START | |
|---|---|
| MasterInformationBlock ::= | SEQUENCE { |
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| schedulingInfoSIB1-BR-r13 | INTEGER (0..31), |
| systemInfoUnchanged-BR-r15 | BOOLEAN, |
| spare | BIT STRING (SIZE (4)) |
| } | |
| -- ASN1STOP | |

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple NIPDCCHs are supported and a set of NIPDCCHs are monitored by the UE; (4) The MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 15:
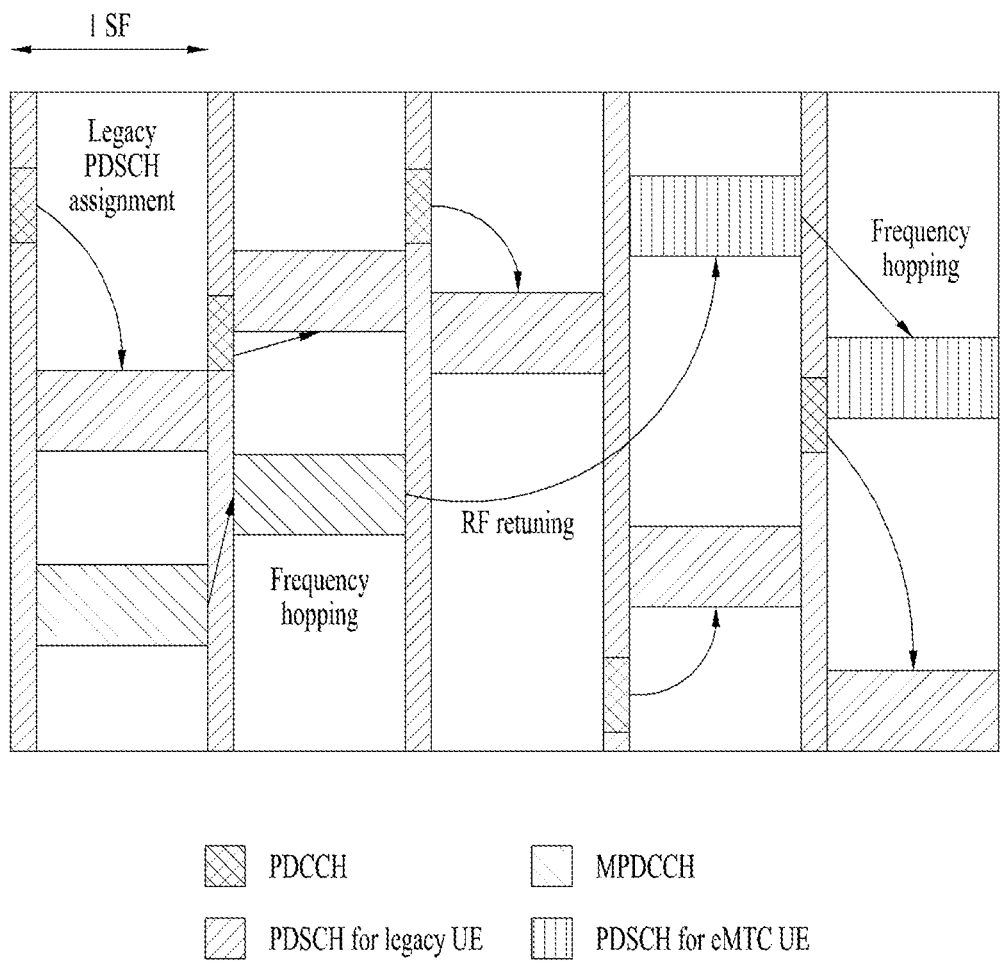
FIG. 15 illustrates an example of scheduling for each of MTC and legacy LTE.

FIG. 15 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH F. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 16:
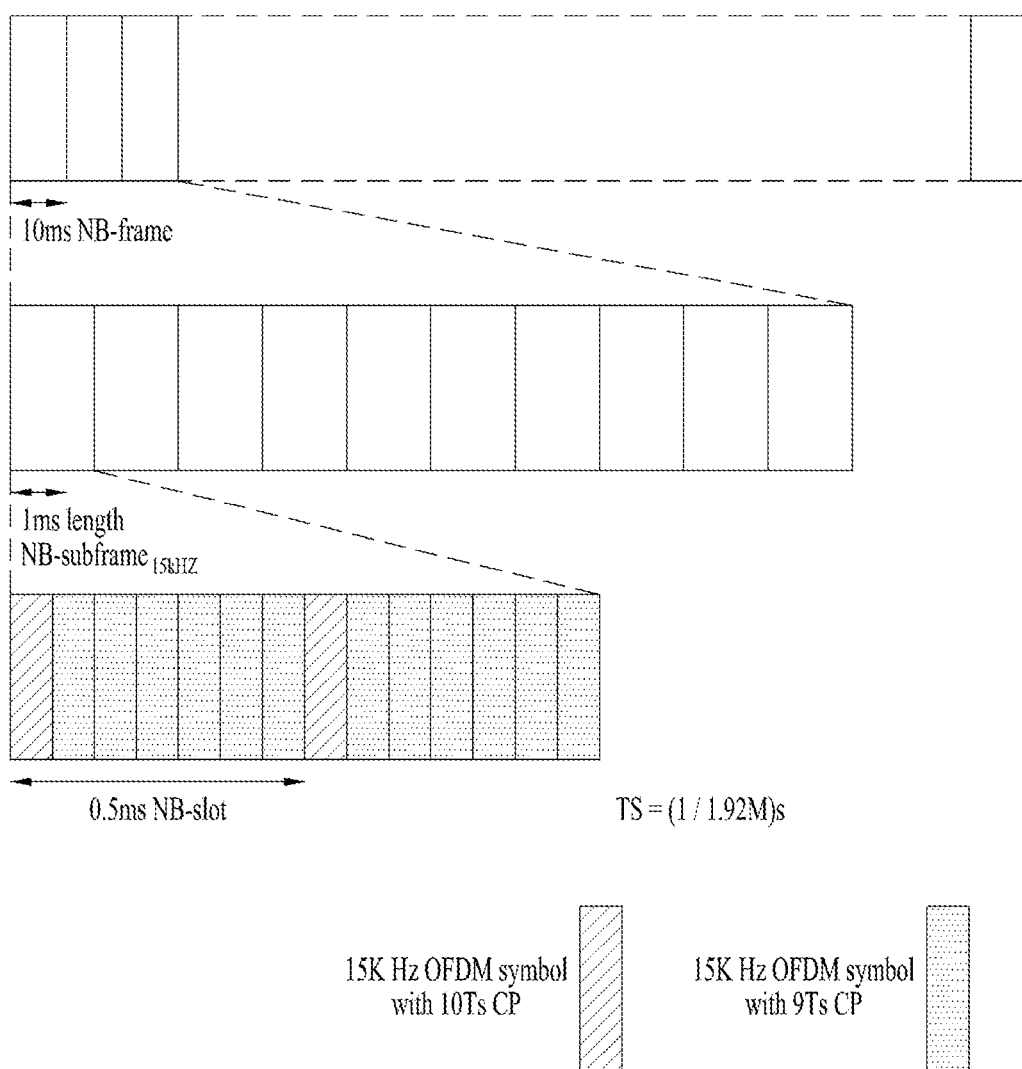
FIGS. 16 and 17 illustrate examples of NB-IoT frame structures according to subcarrier spacing.
Figure 17:
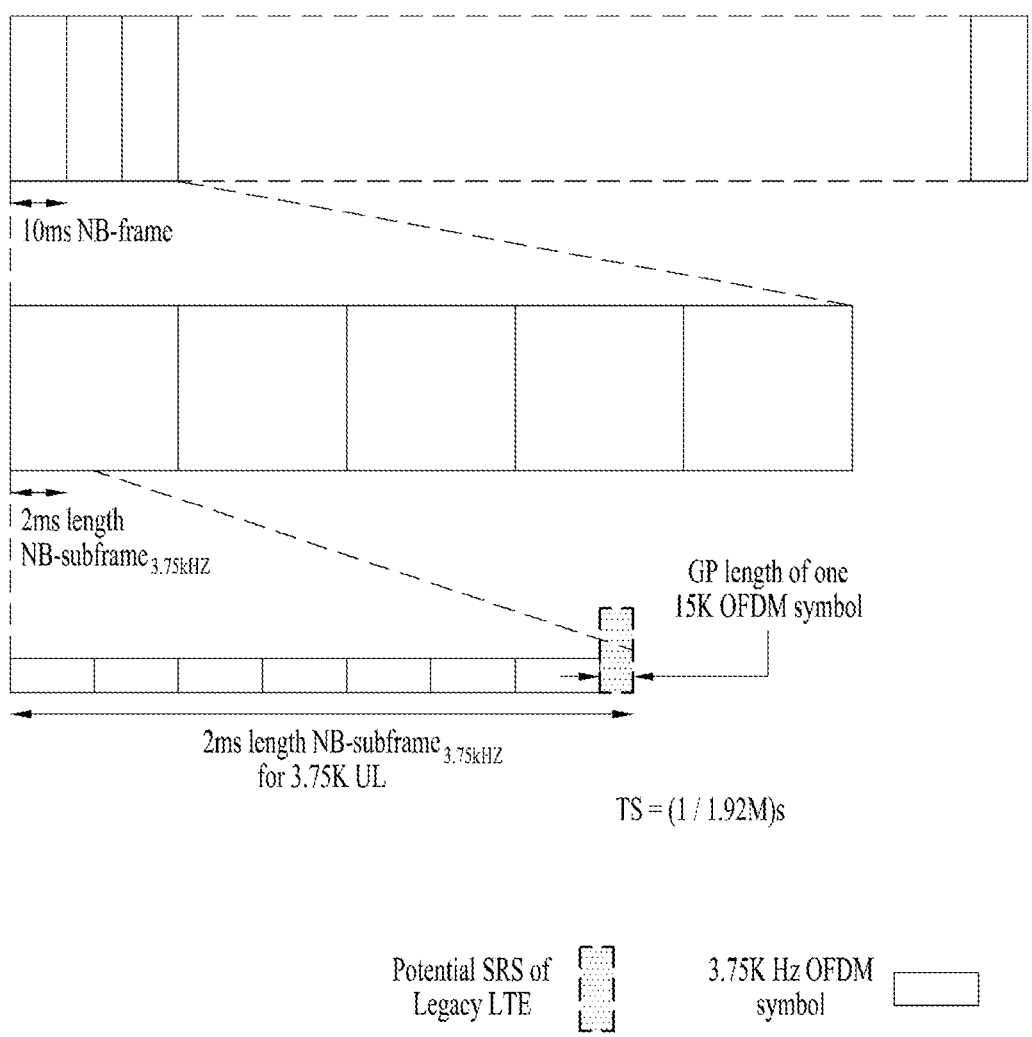

FIGS. 16 and 17 illustrate examples of NB-IoT frame structures according to subcarrier spacing (SCS). Specifically, FIG. 16 illustrates a frame structure with SCS of 15 kHz, and FIG. 17 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 16, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 17, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 18:
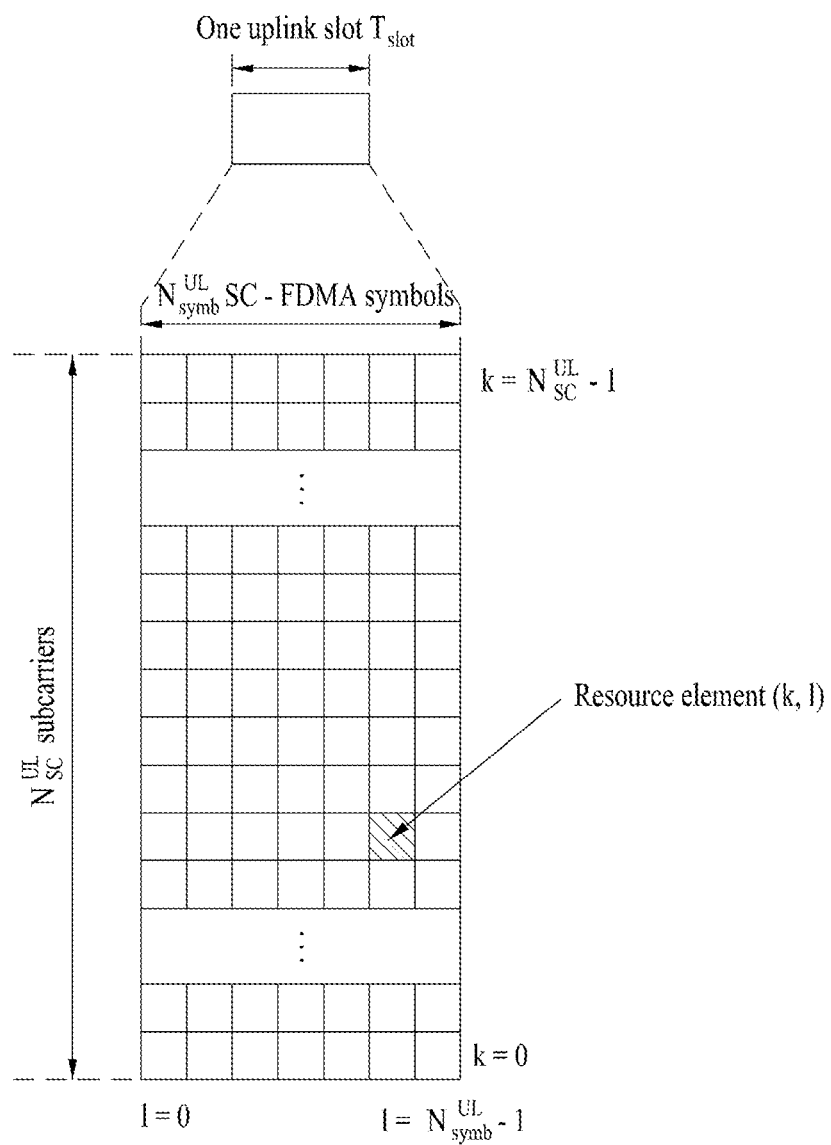
FIG. 18 illustrates an example of the resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 18. The number of subcarriers $N_{sc}^{UL}$ and the slot period $T_{slot}$ may be given in Table 10 below.

FIG. 18 illustrates an example of the resource grid for NB-IoT uplink.

TABLE 10

| Subcarrier spacing | $N_{sc}^{UL}$ | $T_{slot}$ |
|---|---|---|
| $\Delta f = 3.75$ kHz | 48 | $61440 \cdot T_s$ |
| $\Delta f = 15$ kHz | 12 | $15360 \cdot T_s$ |

A resource unit (RU) for the NB-IoT uplink may include SC-FDMA symbols in the time domain and $N_{symb}^{UL} N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 12

| NPUSCH format | $\Delta f$ | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 19A:
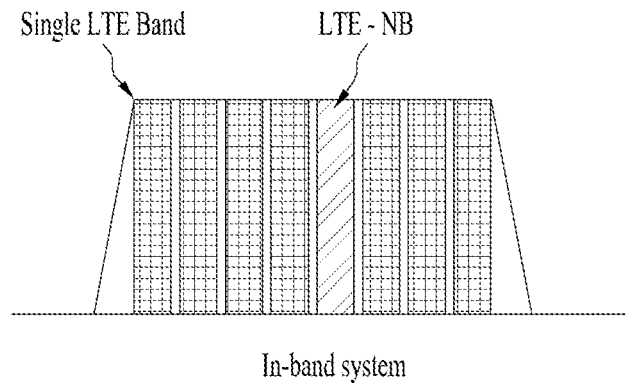
FIGS. 19A to 19C illustrate an examples of operation modes supported in the NB-IoT system.
Figure 19B:
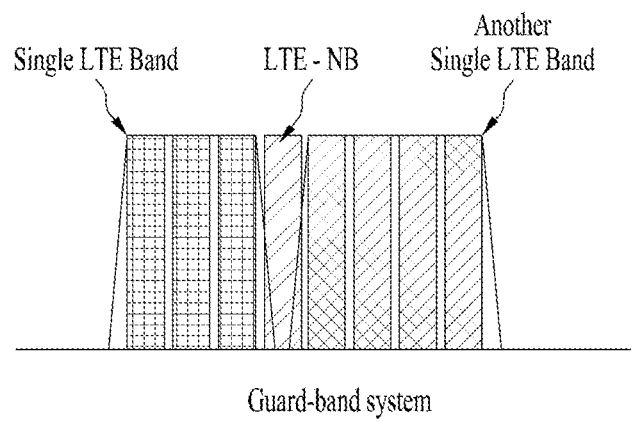
Figure 19C:
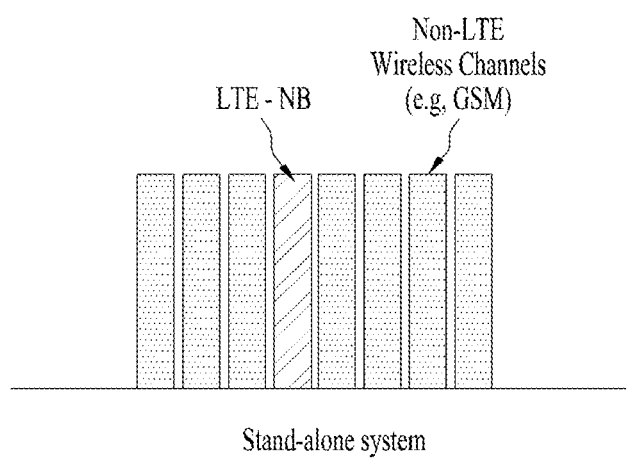

The operation mode of the NB-IoT will be described. The NB-IoT system may support three operation modes. FIGS. 19A to 19C illustrate an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 19A illustrates an in-band system, FIG. 19B illustrates a guard-band system, and FIG. 19C illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

Figure 20:
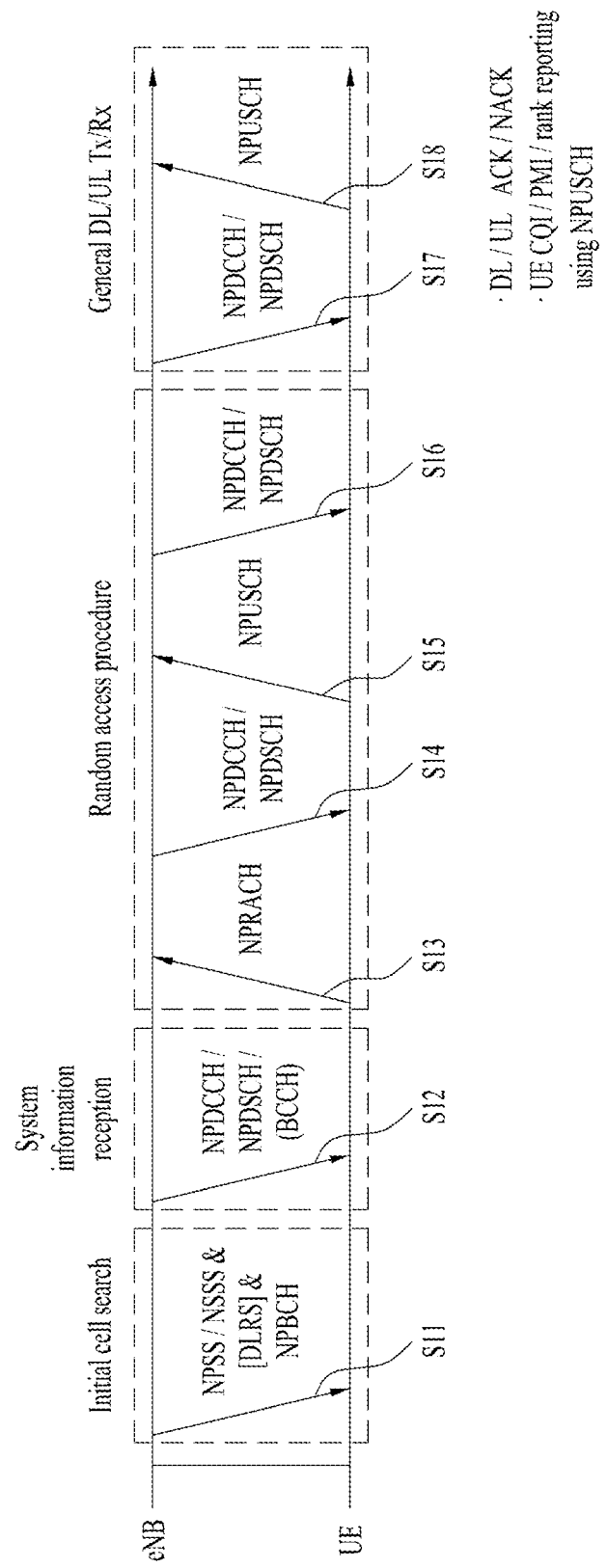
FIG. 20 illustrates an example of physical channels available in the NB-IoT and a general signal transmission method using the same.

FIG. 20 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

6) Initial Access Procedure in NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 21:
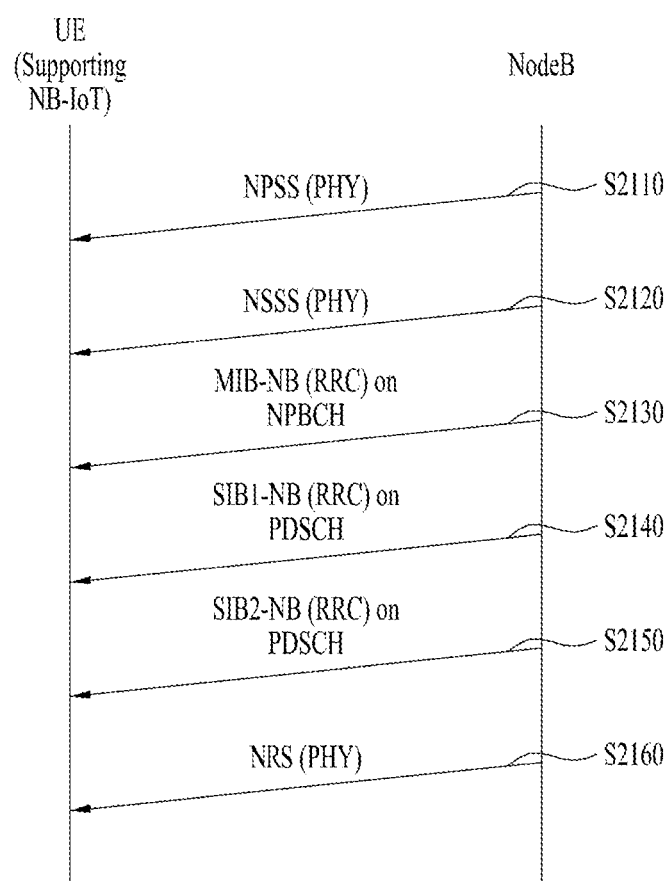
FIG. 21 illustrates an example of the initial access procedure in the NB-IoT.

FIG. 21 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 21.

FIG. 21 illustrates an example of the initial access procedure in the NB-IoT. The name of each physical channel and/or signal may vary depending on the wireless communication system to which the NB-IoT is applied. For example, although the NB-IoT based on the LTE system is considered in FIG. 21, this is merely for convenience of description and details thereof are applicable to the NB-IoT based on the NR system. The details of the initial access procedure are also applicable to the MTC.

Referring to FIG. 21, the NB-IoT UE may receive a narrowband synchronization signal (e.g., NPSS, NSSS, etc.) from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

7) Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 22:
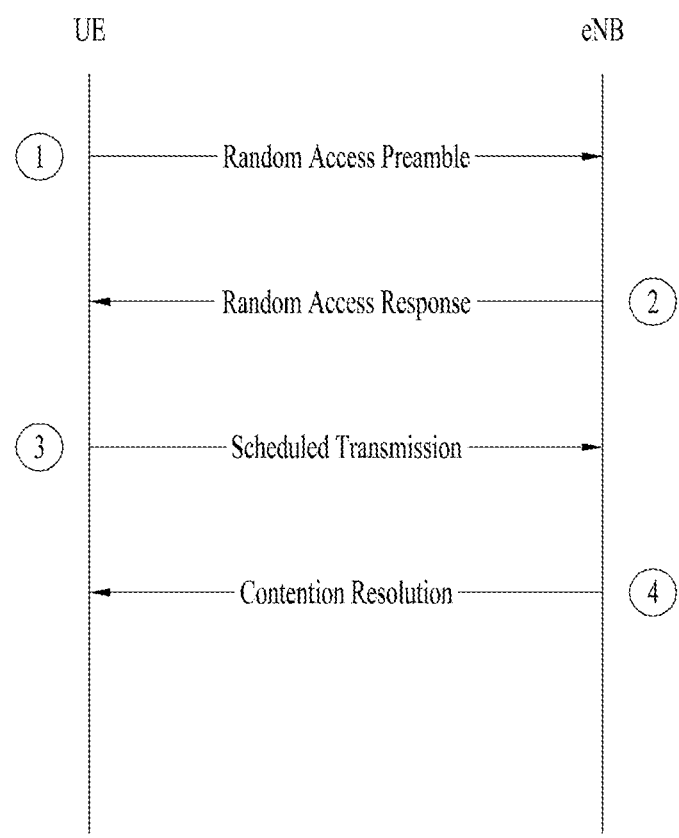
FIG. 22 illustrates an example of the random access procedure in the NB-IoT.

FIG. 22 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 22 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 22, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

8) DRX Procedure in NB-IoT

While performing the general signal transmission and reception procedure of the NB-IoT, the NB-IoT UE may transit to an idle state (e.g., RRC IDLE state) and/or an inactive state (e.g., RRC INACTIVE state) to reduce power consumption. The NB-IoT UE may be configured to operate in DRX mode after transiting to the idle state and/or the inactive state. For example, after transiting to the idle state and/or the inactive state, the NB-IoT UE may be configured to monitor an NPDCCH related to paging only in a specific subframe (frame or slot) according to a DRX cycle determined by the BS. Here, the NPDCCH related to paging may refer to an NPDCCH scrambled with a P-RNTI.

Figure 23:
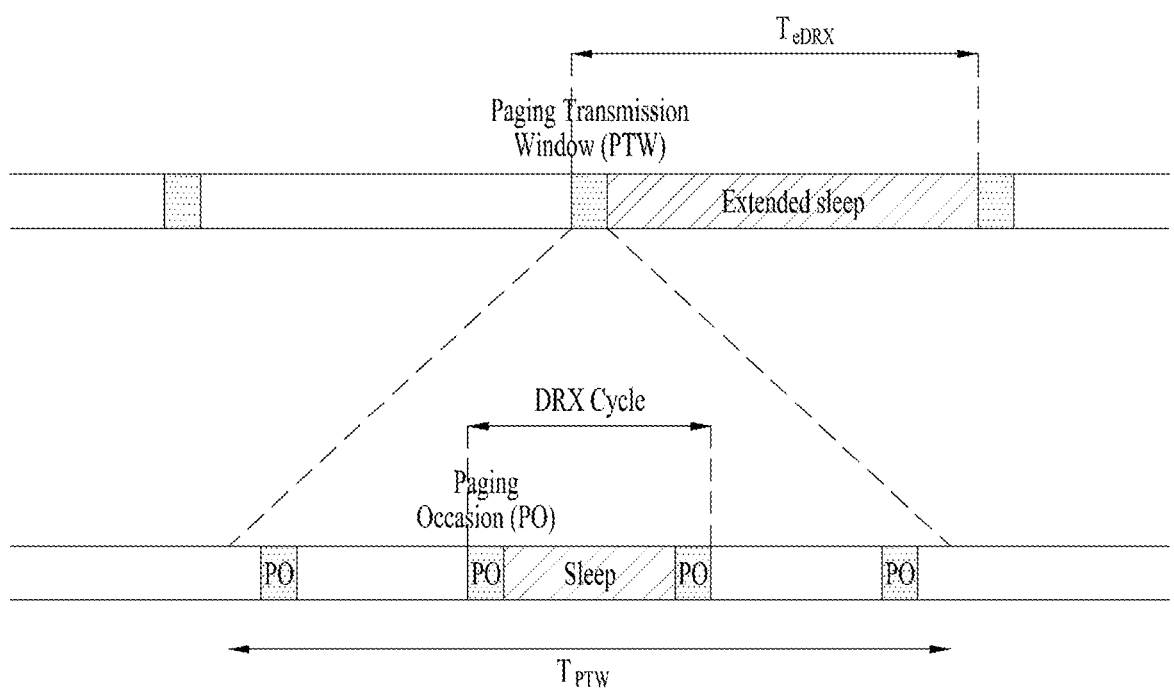
FIG. 23 illustrates an example of DRX mode in an idle state and/or an inactive state.

FIG. 23 illustrates an example of DRX mode in an idle state and/or an inactive state.

Figure 24:
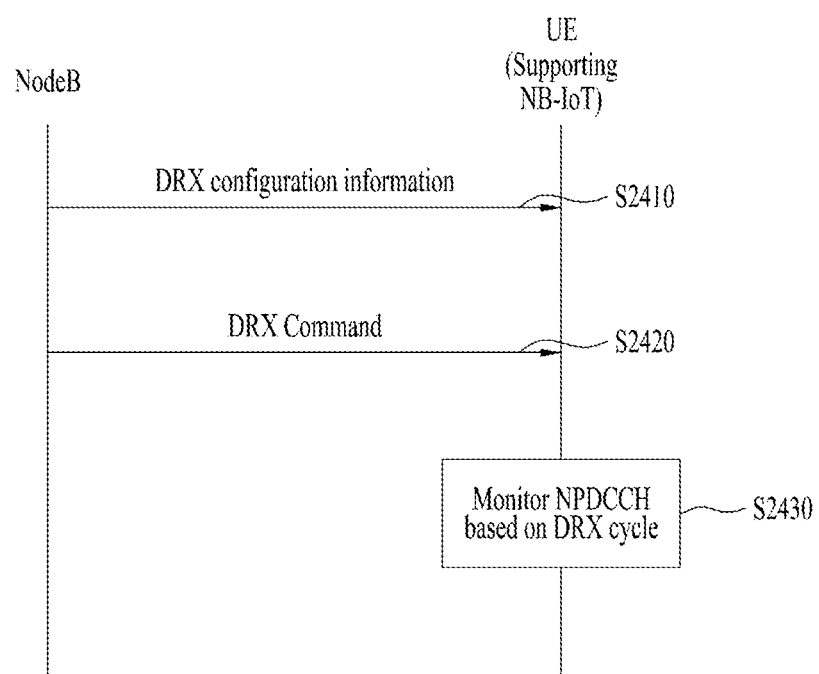
FIG. 24 illustrates an example of a DRX configuration and indication procedure for the NB-IoT UE.

A DRX configuration and indication for the NB-IoT UE may be provided as shown in FIG. 24. That is, FIG. 24 illustrates an example of a DRX configuration and indication procedure for the NB-IoT UE. However, the procedure in FIG. 24 is merely exemplary, and the methods proposed in the present disclosure are not limited thereto.

Referring to FIG. 24, the NB-IoT UE may receive DRX configuration information from the base station (e.g., NodeB, eNodeB, eNB, gNB, etc.) (S2410). In this case, the UE may receive the information from the base station through higher layer signaling (e.g., RRC signaling). The DRX configuration information may include DRX cycle information, a DRX offset, configuration information for DRX-related timers, etc.

Thereafter, the NB-IoT UE may receive a DRX command from the base station (S2420). In this case, the UE may receive the DRX command from the base station through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2430). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 24, the NB-IoT UE may initialize (or reconfigure) the connection (e.g., RRC connection) with the base station (for example, the UE may perform the cell search procedure of FIG. 20). Alternatively, the NB-IoT UE may receive (or obtain) new system information from the base station (for example, the UE may perform the system information acquisition procedure of FIG. 20).

G. Method for Transport Block Transmission and Reception and/or Hybrid Automatic Repeat reQuest (HARQ) Operation in Consideration of Repeated Transmission of Physical Signal and/or Channel In the NB-IoT or eMTC system, the same physical signal/channel may be repeated for each predetermined time unit (e.g., symbol, slot (or NB-slot), subframe, etc.) for coverage enhancement (CE).

For example, the UE and/or BS may improve detection and/or decoding performance by applying symbol-level combining to continuously-transmitted physical signals/channels. Particularly, the symbol-level combining is suitable when the UE has zero or very low mobility and thus each predetermined time unit (e.g., symbol, slot (or NB-slot), subframe, etc.), where the repetition is performed, has almost the same radio environment.

However, there may be a problem. That is, when deep fading occurs in such a radio environment, the reception performance of the corresponding physical signals/channels may be affected thereby for a long time. In addition, since the amount of time-domain resources increase due to the repetition, there may be other problems. That is, the resource consumption of the BS and scheduling restriction between different UEs may need to be considered. When the number of repetitions increases, coverage may be improved. However, in this case, since the amount of time-domain resources increases, resource efficiency decreases. Further, the scheduling opportunities of other UEs may be interrupted.

To solve the above problems, the present disclosure proposes methods applicable when multi-HARQ operation (or multiple-HARQ operation) and multi-transport block (TB) transmission (or multiple-TB transmission) are used in a system where repetition is applied to physical signal/channel transmission. Herein, the multi-HARQ operation may mean operation of indicating or applying one or more HARQ processes and be referred to as a multi-HARQ process.

Specifically, the present disclosure proposes methods for interleaved transmission (cross-transmission) of a plurality of physical signals/channels to obtain transmit diversity when a UE obtains a grant (e.g., DL grant, UL grant) for the plurality of physical signals/channels from one or more DCIs and when repetition is applied to each physical signal/channel for transmission thereof. It is apparent that the methods proposed in the present disclosure may be used to obtain other effects as well as the transmit diversity. Cross-transmission or cross-reception may refer to interleaving or interlacing a plurality of signals on a specific unit basis.

The methods proposed in the present disclosure may be suitable for a structure in which the multi-HARQ operation can be indicated by single DCI. However, it is apparent that the methods proposed in the present disclosure are applicable when multiple DCI are used to indicate the multi-HARQ operation. In addition, the methods proposed in the present disclosure may be extended and applied when the multi-TB transmission is triggered by other means besides DCI. For example, when transmission resources are semi-statically reserved through an SIB and/or higher layer signaling (e.g., RRC signaling, MAC-CE, etc.), the UE and/or BS may be configured to perform transmission and reception based on the methods proposed in the present disclosure.

It may be assumed in the present disclosure that each of the NPDSCH and NPUSCH is transmitted in one TB or repeated TBs unless specified otherwise. For example, one TB may refer to a codeword including at least one outer code (e.g., CRC) and be composed of multiple predetermined time units (e.g., slot, subframe, etc.). However, the present disclosure is not limited to the use of the TB and may be applied on a code block (CB) or code block group (CBG) basis.

The TB may be used by the BS and UE as a unit for managing scheduling (e.g., HARQ process). The multi-HARQ process described herein may have the same meaning as a process for transmitting and receiving multiple TBs. The multi-HARQ operation described herein may be extended to the multi-TB transmission where one or more TBs are scheduled with no HARQ process unless it collides with the proposed methods.

Although the present disclosure is described by assuming that the NB-IoT system uses two HARQ processes (i.e., two HARQ operations are configured) for convenience of description, it is obvious that the proposed methods are generally applicable to systems capable of controlling multiple HARQ processes. In addition, the methods proposed in the present disclosure may be combined and used together unless they collide with each other.

The present disclosure is described based on the concept of 'subframe'. However, this is merely to explain the basic transmission unit of a wireless communication system. Thus, it is apparent that the methods proposed in the present disclosure are applicable when the concepts of 'slot (or NR slot)', 'symbol', etc. are used as the basic transmission unit without departing from the spirit of the present disclosure.

Although the operations and/or methods of the present disclosure are described based on the NB-IoT, the operations and/or methods may be extended and applied to the MTC in the same or similar manner. For example, in the case of the MTC, the methods proposed in the present disclosure may be extended and applied to four HARQ processes and/or 8 HARQ processes. A physical channel on which the multi-TB transmission is performed according to the methods proposed in the present disclosure may include the PDSCH, PUSCH, and/or PUCCH that carries control information corresponding to multiple TBs (e.g., ACK/NACK information). The NB-IoT-related channels such as the NPDCCH, NPDSCH, NPUSCH, etc., which are mentioned herein, may be replaced with MTC-related channels such as the MPDCCH, PDSCH, PUSCH, etc. In the present disclosure, the terms "NPDSCH" and "NPUSCH" are defined and used to refer DL and UL channels, respectively. However, it is obvious that the present disclosure is equally applicable to other UL/DL transmission.

The operations and/or methods of the present disclosure are described based on a downlink (DL) data channel (e.g., NPDSCH) and an uplink (UL) data channel (e.g., NPUSCH). However, this is merely for convenience of description, and the operations and/or methods proposed in the present disclosure are extended and applied to a DL control channel (e.g., NPDCCH) and a UL control channel (e.g., NPUSCH). That is, the methods proposed in the present disclosure are applicable to a control channel and/or a data channel (i.e., traffic channel) of which transmission is explicitly or implicitly configured by DCI. For example, in the case of the traffic channel, the proposed methods may be applied when multiple NPUSCH format is or multiple NPDSCHs are scheduled by one DCI. In the case of the control channel, the proposed methods may be applied to transmission of multiple NPUSCH format 2s corresponding to feedback channels for multiple NPDSCHs.

The operations and/or methods of the present disclosure are described based on the NPDSCH, which is related to DL. However, this is merely for convenience of description, and the operations and/or methods proposed in the present disclosure may be extended and applied to the NPUSCH, which is related to UL.

Method for Interleaved-Transmission/Reception (Cross-Transmission/Reception) of Multiple Physical Signals/Channels In the prior art (e.g., 3GPP Rel-14), when the UE obtains grants (e.g., DL and UL grants) for two NPDSCHs (or NPUSCHs) in two HARQ processes of the conventional NB-IoT, transmission of one NPDSCH (or NPUSCH) may be configured to start after completion of transmission of the other NPDSCH (or NPUSCH). In this case, the grant for the NPDSCH or NPUSCH may refer to information (e.g., resources, etc.) required for transmitting and receiving the NPDSCH or NPUSCH.

Figure 25A:
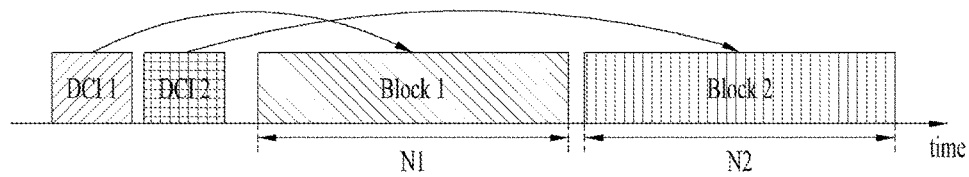
FIGS. 25A to 25C illustrate examples of scheduling structures for two HARQ processes and channel quality based thereon.
Figure 25B:
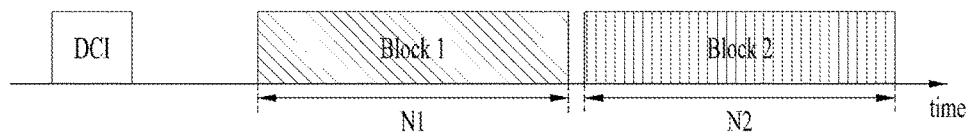
Figure 25C:
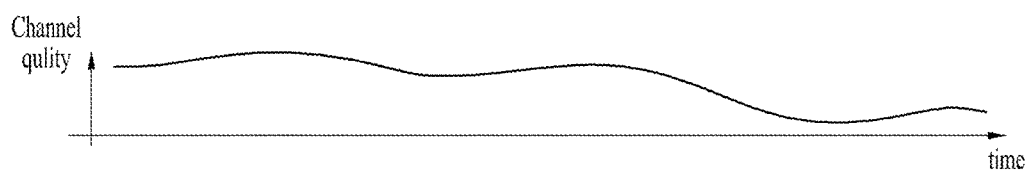

FIGS. 25A to 25C illustrate examples of scheduling structures according to two HARQ processes and channel quality based thereon. FIGS. 25A to 25C are merely for illustrative purposes, and the scope of the present disclosure is not limited thereto.

FIG. 25A shows scheduling structures for two HARQ processes in the conventional NB-IoT. In this case, the structure of a single HARQ process may reused without any change, but one physical channel may become a deep fading channel. The deep fading channel may refer to a channel that is not received and/or detected by a device due to interference.

To solve the above problem, the present disclosure proposes a structure in which multiple physical channels (or signals) (in the present disclosure, for convenience, referred to as L physical channels or signals where L is an integer greater than 1) are interleaved-transmitted.

Specifically, Method 1 below may be used to interleaved-transmit and interleaved-receive the L physical channels. Although Method 1 is described based on the NPDSCH, this is merely for convenience of description. That is, the corresponding method may be extended and applied to NPUSCH transmission, interleaved-transmission of the NPDSCH and NPUSCH, or other control channels. In addition, although Method 1 is described based on the concept of subframe, Method 1 is applicable to other types of resources or units in the time domain (e.g., slot, symbol, etc.).

(Method 1)

It is assumed a set of {NPDSCH-1, . . . , NPDSCH-L} including L NPDSCHs is scheduled by single DCI and the transmission length of an ith-NPDSCH in the corresponding set, NPDSCH-i is Ni subframes, where i has a value from 1 to L.

In this case, NPDSCH-i may be divided into Mi sub-blocks, and each sub-block may be used as a basic unit for determining the type of NPDSCH transmission. The BS may transmit the sub-blocks of NPDSCH-i in an interleaved order (or alternately), and thus, the UE may receive the sub-blocks of NPDSCH-i in an interleaved order (or alternately).

FIG. 25B shows a scheduling structure for two HARQ processes to which the methods proposed in the present disclosure are applicable. Although FIG. 25B assumes that the value of L is set to 2, the present disclosure is not limited thereto.

Referring to FIG. 25B, the UE may receive DCI from the BS and may be scheduled with two NPDSCHs (NPDSCH-1 and NPDSCH-2). Accordingly, the UE may receive the two NPDSCHs from the BS. In this case, the BS may instruct the UE to receive the two NPDSCHs by dividing each of them into one or more sub-blocks.

The UE may receive the two NPDSCHs by respectively dividing the two NPDSCHs into M1 sub-blocks (e.g., M1=4) and M2 sub-blocks (e.g., M2=4), instead of receiving the two NPDSCHs in block 1 of N1 time unit and block 2 of N2 time unit, respectively. In particular, the UE may be configured to interleave and receive the sub-blocks corresponding to NPDSCH-1 and the sub-blocks corresponding to NPDSCH-2

For example, when the channel quality slowly varies as shown in FIG. 25C, if the sub-blocks of NPDSCH-1 and the sub-blocks of NPDSCH-2 are interleaved and transmitted, it is advantageous in that the time diversity effect can be achieved.

To apply Method 1, both transmitting and receiving ends (e.g., BS and UE, or UE and BS) may need to know information about an interleaved-transmission configuration (structure) of sub-blocks. The corresponding information may include not only basic information needed for transmitting and receiving each NPDSCH (or NPUSCH) (e.g., TBS, modulation order, repetition number, resource allocation, etc.) but also information about the sub-blocks (sub-block-related information). The sub-block-related information may include the number of sub-blocks included in each NPDSCH (or NPUSCH), the length of each sub-block, the transmission timing of each sub-block, a sub-block pattern, a gap or offset between sub-blocks, etc.

Based on the above discussion, the present disclosure proposes a method (Method 1-1) of determining the configuration of a sub-block when Method 1 is applied. Although Method 1-1 is described based on the NPDSCH, this is merely for convenience of description. That is, the corresponding method may be extended and applied to the NPUSCH transmission, the interleaved-transmission of the NPDSCH and NPUSCH, or other control channels.

(Method 1-1)

When Method 1 is applied, the BS may provide or transmit information about the length and/or number of sub-blocks that constructs each NPDSCH to the UE. For example, each sub-block may have a different length, and in this case, the BS may inform the UE of the length of each sub-block. Alternatively, the length of the sub-block may be indirectly indicated by the total length of each NPDSCH and the number of sub-blocks in a corresponding NPDSCH. Further, each sub-block may be configured to have the same length, and in this case, the BS may transmit information on the length of one sub-block to the UE.

The above sub-block-related information may be dynamically configured or indicated in DCI or semi-statically configured or indicated through higher layer signaling such as system information or RRC signaling. Alternatively, the information may be configured or indicated over a random downlink physical channel (e.g., a (N)PDSCH for transmitting a single cell-multicast control channel (SC-MCCH)).

In other words, the BS may transmit the sub-block-related information to the UE through physical layer signaling and/or higher layer signaling.

In Method 1-1, both the length of a sub-block and the number of sub-blocks may be explicitly indicated. In this case, the total transmission length of the NPDSCH may be determined as the sum of the lengths of sub-blocks.

Alternatively, in Method 1-1, either the length of the sub-block or the number of sub-blocks may be explicitly indicated. When the explicitly indicated information is defined as "info-A" and the other information is defined as "info-B", info-B may be a fixed value defined in the standards or a value implicitly estimated by combining info-A and other parameters. For example, info-B may be determined by a function having as input the total transmission length of the NPDSCH and info-A. Alternatively, info-B may correspond to a specific value indicated (or mapped) by a Table defined based on info-A.

Figure 26:
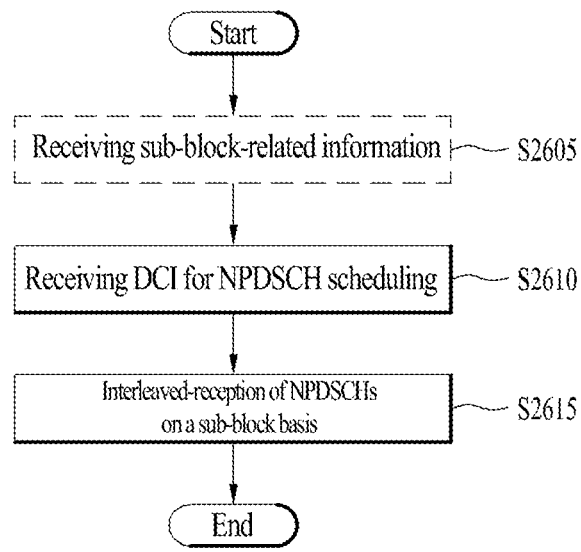
FIG. 26 illustrates an example of a flowchart for the operations of a UE that performs an interleaved reception between sub-blocks of one or more physical channels/signals to which the methods proposed in the present disclosure are applicable.
Figure 27:
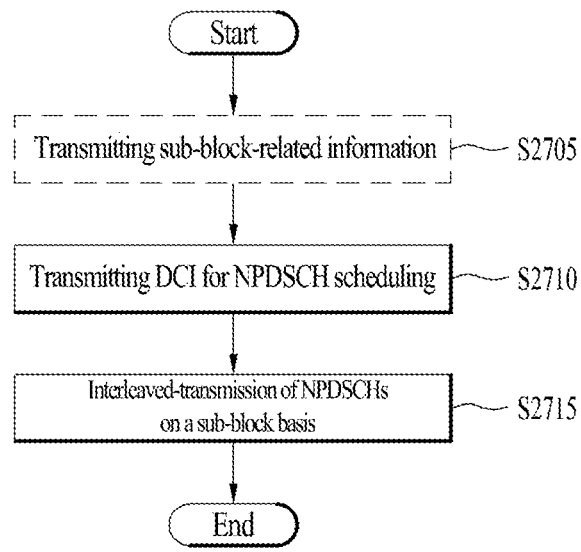
FIG. 27 illustrates an example of a flowchart for the operations of a base station that performs an interleaved transmission between sub-blocks of one or more physical channels/signals to which the methods proposed in the present disclosure are applicable.
Figure 28:
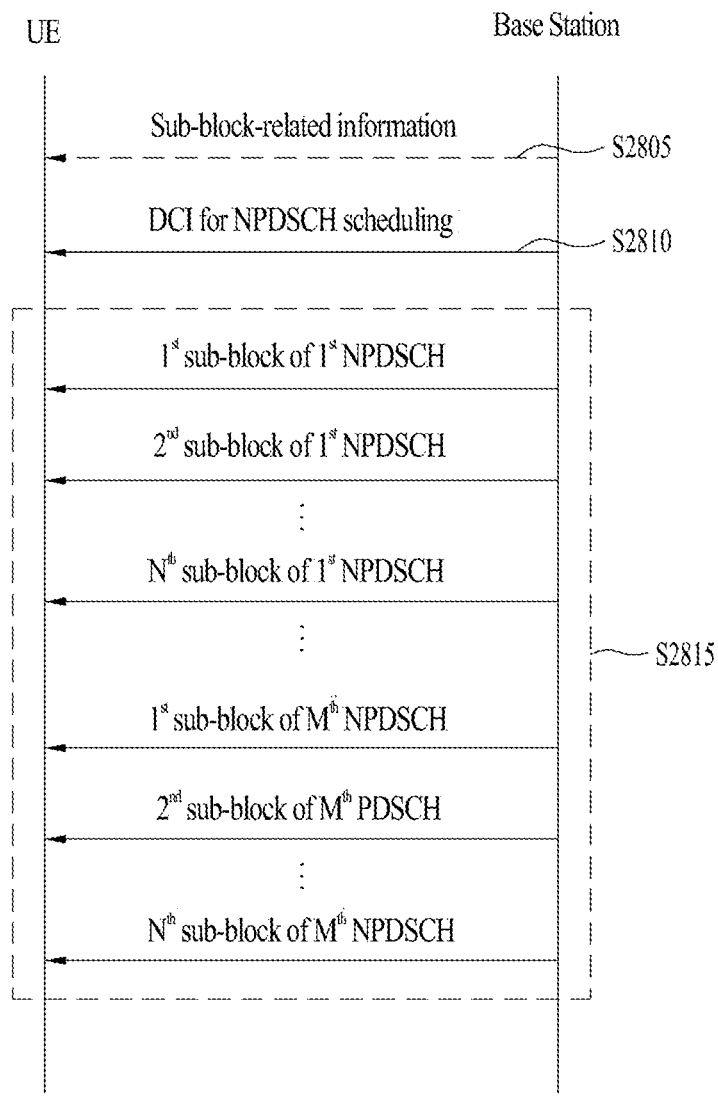
FIG. 28 illustrates an example of signaling between a base station and a UE that perform an interleaved transmission/reception between sub-blocks of one or more physical channels/signals to which the methods proposed in the present disclosure are applicable.

FIGS. 26 to 28 are flowcharts illustrating the operations of a UE and a BS and signaling therebetween when one or more NPDSCHs are transmitted and received on a sub-block basis based on Method 1. Similarly, although the descriptions of FIGS. 26 to 28 are made based on the NPDSCH, these are merely exemplary. That is, the corresponding methods may be extended and applied to the NPUSCH transmission, the interleaved-transmission of the NPDSCH and NPUSCH, or other control channels. Further, the operations illustrated in FIGS. 26 to 28 may be commonly applied to the methods proposed in the present disclosure.

FIG. 26 is a flowchart illustrating the operations of a UE that performs interleaved-reception of sub-blocks of at least one physical channel/signal to which the methods proposed in the present disclosure are applicable. FIG. 26 is merely for illustrative purposes, and the scope of the present disclosure is not limited thereto. Similarly, although the description of FIG. 26 is made based on the NPDSCH, this is merely exemplary. That is, the corresponding method may be extended and applied to the NPUSCH transmission, the interleaved-transmission of the NPDSCH and NPUSCH, or other control channels.

The UE may receive sub-block-related information from a BS (S2605). For example, the UE may receive the corresponding information through higher layer signaling such as system information and/or RRC signaling. Alternatively, when the UE is configured to receive the corresponding information through physical layer signaling such as DCI (for example, step S2610), the process for receiving the sub-block-related information, i.e., step S2605 may be skipped. Then, the UE may receive at least one DCI for NPDSCH scheduling from the BS (S2610). In this case, the UE may recognize that one or more NPDSCHs are to be transmitted from the BS on a sub-block basis. In addition, the UE may check the times and resources used for transmission of sub-blocks of the one or more NDPSCHs. Thereafter, the UE may perform interleaved-reception (or cross-reception) of the one or more NPDSCHs from the BS on a sub-block basis (S2615). For example, the UE may be configured to interleave and receive sub-blocks of a first NPDSCH and sub-blocks of a second NPDSCH.

Figure 36:
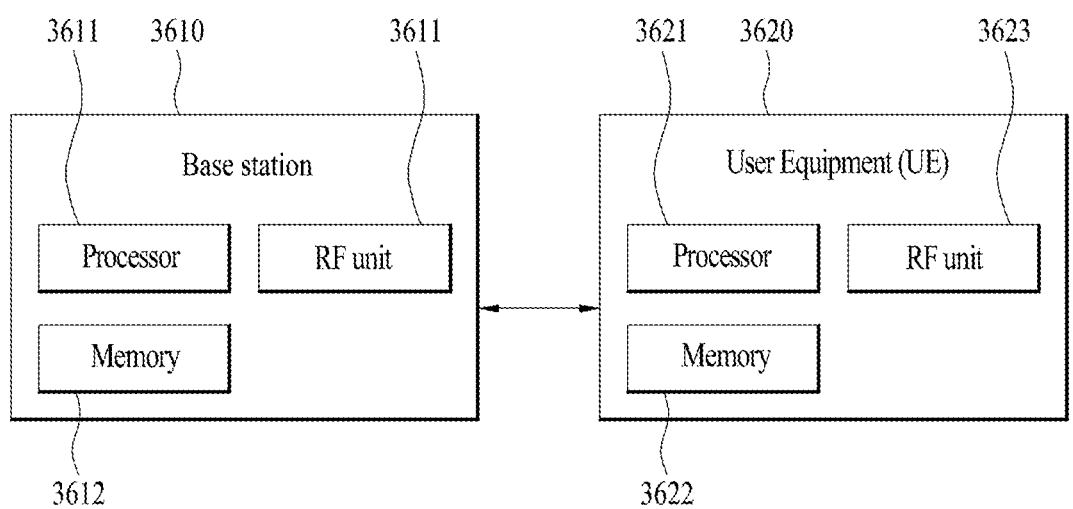
FIG. 36 illustrates examples of block diagrams of wireless communication apparatuses to which the methods proposed in the present disclosure are applicable.

The device shown in FIG. 11 and/or FIG. 36 may be used to implement the corresponding UE. Accordingly, the operation of each step illustrated in FIG. 26 may be performed by the UE device shown in FIG. 11 and/or FIG. 36.

FIG. 27 is a flowchart illustrating the operations of a BS that performs interleaved-transmission of sub-blocks of at least one physical channel/signal to which the methods proposed in the present disclosure are applicable. FIG. 27 is merely for illustrative purposes, and the scope of the present disclosure is not limited thereto.

The BS may transmit sub-block-related information to a UE (S2705). For example, the BS may transmit the corresponding information through higher layer signaling such as system information and/or RRC signaling. Alternatively, when the BS is configured to transmit the corresponding information through physical layer signaling such as DCI (for example, step S2710), the procedure of transmitting the sub-block-related information, i.e., step S2705 may be skipped. Then, the BS may transmit at least one DCI for NPDSCH scheduling to the UE (S2710). In this case, the UE may recognize that one or more NPDSCHs are transmitted from the BS on a sub-block basis. Thereafter, the BS may perform interleaved-transmission of the one or more NPDSCHs to the UE on a sub-block basis (S2715). For example, the BS may be configured to interleave and transmit sub-blocks of a first NPDSCH and sub-blocks of a second NPDSCH.

The device shown in FIG. 11 and/or FIG. 36 may be used to implement the corresponding BS. Accordingly, the operation of each step illustrated in FIG. 27 may be performed by the BS device shown in FIG. 11 and/or FIG. 36.

FIG. 28 illustrates signaling between a BS and a UE that perform interleaved-transmission/reception of sub-blocks of at least one physical channel/signal to which the methods proposed in the present disclosure are applicable. FIG. 28 is merely for illustrative purposes, and the scope of the present disclosure is not limited thereto.

The UE may receive sub-block-related information from the BS (S2805). For example, the UE may receive the corresponding information through higher layer signaling such as system information and/or RRC signaling. Alternatively, when the UE is configured to receive the corresponding information through physical layer signaling such as DCI (for example, step S2810), the procedure of receiving the sub-block-related information, i.e., step S2805 may be skipped. Then, the UE may receive at least one DCI for NPDSCH scheduling from the BS (S2810). In this case, the UE may recognize that one or more NPDSCHs are transmitted from the BS on a sub-block basis. Thereafter, the UE may perform interleaved-reception of the one or more NPDSCHs from the BS on a sub-block basis (S2815). For example, the UE may receive first sub-blocks until an N-th NPDSCH and then receive second sub-blocks until the N-th NPDSCH. That is, the UE may be configured to receive M-th sub-blocks until the N-th NPDSCH by repeating the above operation. However, the above operation is merely an example of interleaving and receiving the sub-blocks of each NPDSCH. That is, when a transmission pattern related to sub-block transmission is configured, the UE may attempt to receive the sub-blocks according to the corresponding transmission pattern.

When the UE interleaves and receives multiple configured NPDSCHs on a sub-block basis as described above, it is advantageous in that the time diversity effect can be achieved in terms of the transmit diversity and/or channel quality of the NPDSCH.

When Method 1 is applied, if each sub-block includes all of the TBs that need to be transmitted, the BS and/or UE may determine whether the corresponding TB is successfully received whenever reception of each sub-block is completed. When a repetition is performed for each predetermined time unit (e.g., subframe, slot, symbol, etc.) and a channel does not significantly vary depending on time as in the MTC/NB-IoT system, it may be beneficial to maintain a transmission structure in which the BS and/or UE is capable of performing the symbol-level combining.

Considering the above discussion, the present disclosure proposes a method (Method 1-2) of determining the configuration of a sub-block when Method 1 is applied. Although Method 1-2 is described based on the NPDSCH, this is merely for convenience of description. That is, the corresponding method may be extended and applied to the NPUSCH transmission, the interleaved-transmission of the NPDSCH and NPUSCH, or other control channels.

(Method 1-2)

When Method 1 is applied and when NPDSCH-i is composed of TBs repeated Ri times, each having a length of Ni TB, each sub-block of NPDSCH-i may be composed of TBs repeated Rth times. Here, Ri denotes the number of repetitions scheduled by the BS, Ni denotes the number of subframes included in one TB, and Rth denotes the maximum number of consecutive repetitions.

In this case, Rth may have a predetermined value defined in the standards (e.g., Rth=4). Alternatively, the BS may configure the value of Rth for the UE. The value of Rth may vary depending on the type of transmission. For example, in the case of a single-tone transmission of the NB-IoT, Rth may be set to 1 (Rth=1). Otherwise, Rth may have a value greater than 1 (e.g., Rth=4). In the case of the single-tone transmission, Rth=1 may be applied only to NPUSCH format 1 for transmitting a data channel (i.e., traffic channel). Rth may be set to a value greater than 1 in the case of NPUSCH format 2 for transmitting a control channel.

NPDSCH-i may include Mi=ceil(Ri/Rth) sub-blocks (where ceil( ) indicates a ceiling function). If Ri>Rth, multiple sub-blocks may be generated, and sub-blocks of different NPDSCHs may be interleaved-transmitted and interleaved-received. On the contrary, if Ri≤Rth, one sub-block may be generated for each NPDSCH, and sub-blocks may be sequentially transmitted and received.

When the number of times that the TB is repeated in one sub-block is referred to as "Rsubi", the TB may be determined using the value of Rsubi=min(Ri, Rth). For example, an a-th subframe (or slot) in the TB may be repeatedly mapped from an a*Rsubi-th subframe (or slot) in the sub-block to an (a+1)*Rsubi-1-th subframe (or slot). In addition, each subframe (or slot) included in the TB may be used to configure Rsubi consecutive subframes (or slots) within one sub-block.

The value of Rth in Method 1-2 may be configured for the symbol-level combining. For example, the value of Rth=4 is the same as that used in the current NB-IoT standards and may be suitable for achieving the symbol-level combining.

In Method 1-2, when Ri<Rth, a structure for supporting interleaved-transmission may not be used since the gain of the symbol-level combining may be higher than that of the interleaved-transmission. In Method 1-2, when Ri>Rth, the interleaved-transmission may start after transmission of one sub-block in order to improve diversity gain in the time domain.

Figure 29:
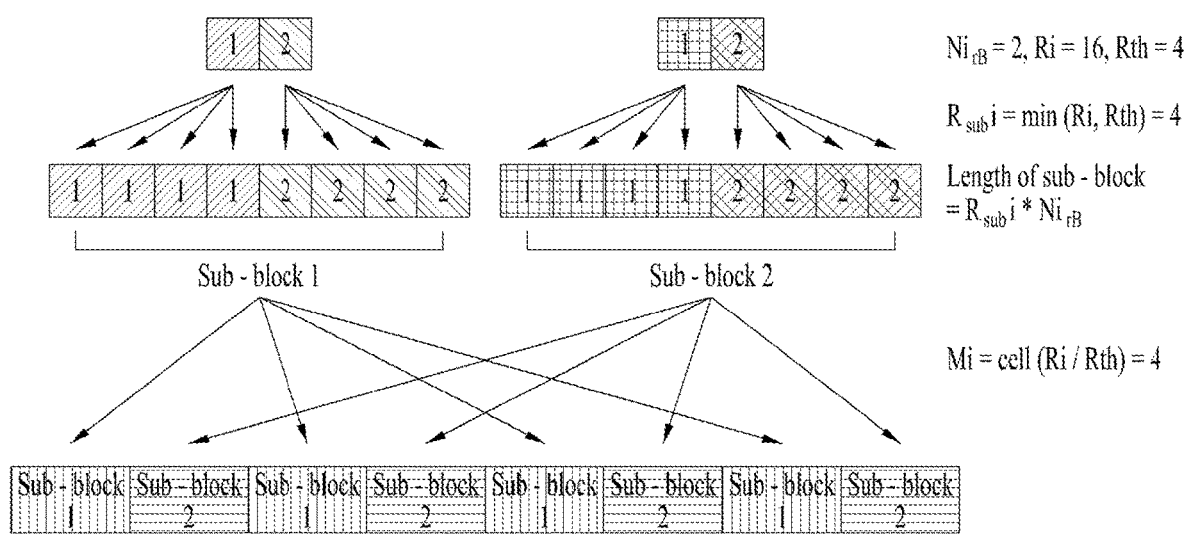
FIG. 29 illustrates an example of a sub-block configuration to which the methods proposed in the present disclosure are applicable.

FIG. 29 illustrates the configuration of a sub-block to which the methods proposed in the present disclosure are applicable. FIG. 29 is merely for illustrative purposes, and the scope of the present disclosure is not limited thereto.

Referring to FIG. 29, it may be considered that two TBs (TB 1 and TB 2), each of which is composed of two predetermined time units (e.g., subframe, slot, etc.), are transmitted based on a predetermined time unit level repetition (e.g., subframe level repetition, slot level repetition, etc.). In the case of Rth=4, each TB may be configured to be repeated and transmitted 16 times.

As described above, the present disclosure may be applied on a CB or CBG basis. In this case, Ni denotes the number of CBs or CBGs rather than the number of subframes.

Considering the necessity mentioned in the above methods, the present disclosure proposes a method (Method 1-3) of determining the transmission timing of each sub-block when Method 1 is applied. Although Method 1-3 is described based on the NPDSCH, this is merely for convenience of description. That is, the corresponding method may be extended and applied to the NPUSCH transmission, the interleaved-transmission of the NPDSCH and NPUSCH, or other control channels.

(Method 1-3)

When Method 1 is applied, the order of arranging sub-blocks of each NPDSCH in the time domain may follow a specific pattern (such a pattern is referred to as 'sub-block pattern'). The sub-block pattern may be configured using one sub-block as the basic unit, and the order of arranging the sub-blocks of NPDSCH-i may be defined as the sub-block pattern. The sub-block pattern may be fixed by the standards. The BS may transmit configuration information about the sub-block pattern to the UE through higher layer signaling.

For example, the sub-block pattern may be defined by sequentially arranging HARQ process numbers. The HARQ process numbers may be arranged from the smallest number. Additionally or alternatively, the arrangement order of the HARQ process numbers may be sequentially changed whenever retransmission is performed. Additionally or alternatively, in the case of a multi-TB transmission structure having no HARQ process, the order of the HARQ process numbers may be replaced with a random TB index order.

As another example, regarding the sub-block pattern, the order between initial transmission and retransmission may be predetermined.

Further, there may be a plurality of sub-block patterns. In this case, the transmitting and receiving ends (e.g., BS and UE, or UE and BS) may determine a pattern to use according to a predetermined (or predefined) rule. In addition, (con-figuration) information about the pattern to be used may be dynamically indicated through physical layer signaling (e.g., DCI). Alternatively, the information may be semi-statically configured or indicated by higher layer signaling (e.g., SIB, RRC signaling, etc.).

Figures 30A, 30B, 30C, 31:
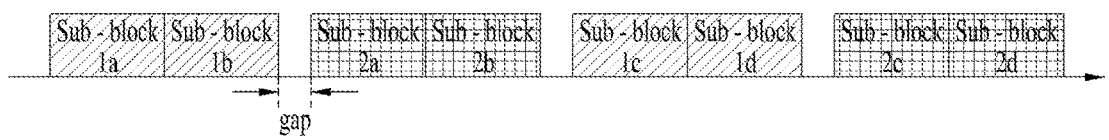
FIGS. 30A to 30C illustrate examples of sub-block patterns to which the methods proposed in the present disclosure are applicable.
FIG. 31 illustrates an example of time positions of transmitting or receiving ACK/NACK feedbacks and sub-blocks to which the methods proposed in the present disclosure are applicable.

FIGS. 30A to 30C illustrate sub-block patterns to which the methods proposed in the present disclosure are applicable. FIGS. 30A to 30C are merely for illustrative purposes, and the scope of the present disclosure is not limited thereto.

FIG. 30A illustrates a pattern in which the sub-blocks of NPDSCH-1 (e.g., sub-block 1a, sub-block 1b, sub-block 1c, and sub-block 1d) and the sub-blocks of NPDSCH-2 (e.g., sub-block 2a, sub-block 2b, sub-block 2c, and sub-block 2d) are interleaved-transmitted one-by-one. FIG. 30A illustrates a pattern in which the sub-blocks of NPDSCH-1 and the sub-blocks of NPDSCH-2 are interleaved-transmitted two-by-two. FIG. 30A illustrates a pattern in which the sub-blocks of NPDSCH-1 and the sub-blocks of NPDSCH-2 are interleaved-transmitted whole-by-whole.

To represent the sub-block pattern, one of the following methods may be used.

For example, the sub-block pattern may be configured by defining the order (transmission order) of sub-blocks in the form of a bitmap. When the BS schedules two NPDSCHs (L=2) for the UE, if the sub-block order of NPDSCH-1 and the sub-blocks of NPDSCH-2 are defined as "0" and "1", respectively, a length-4 bitmap may be represented as (0, 1, 0, 1).

As another example, the sub-block pattern may be configured based on how many sub-blocks created from the same NPDSCH are consecutive. When the BS schedules two NPDSCHs (L=2) for the UE, if the sub-blocks of each NPDSCH interleave one-by-one as shown in FIG. 30A, the BS may inform the UE of the value of "1". On the other hand, if the sub-blocks of each NPDSCH are arranged two-by-two as shown in FIG. 30B, the BS may inform the UE of the value of "2".

As a further example, the sub-block pattern may be configured by indicating the indices of predetermined patterns. When the BS schedules two NPDSCHs (L=2) for the UE, if there are predetermined patterns as shown in FIGS. 30A to 30C, the BS may index the patterns and inform the UE of the index of a pattern to be used.

As still another example, the sub-block pattern may be configured based on the starting index of a HARQ process number. That is, if there is a fixed pattern where HARQ process numbers are sequentially arranged, the BS may inform the UE of the HARQ process number where transmission starts. In the case of the multi-TB transmission structure having no HARQ process, the order of the HARQ process numbers may be replaced with a random TB index order.

When the above-described sub-block pattern is applied to the NPDSCH transmission, when there is an independent UL feedback channel (e.g., NPUSCH format 2) corresponding to each NPDSCH, and when Method 1 is applied, the transmission pattern of the UL feedback channel may be configured to follow that of the NPDSCH.

When there are multiple patterns in Method 1-3, information on an actually used pattern may be explicitly indicated. For example, when there are multiple sub-slot patterns, the BS may explicitly indicate to the UE information on an actually used pattern. However, when the explicit indication of the sub-slot pattern is determined, if related signaling does not exist, the default pattern defined in the standards (or by previous signaling) may be used.

When there are multiple patterns in Method 1-3, information on an actually used pattern may be implicitly estimated by other parameters. That is, the UE may derive information on an actually used sub-slot pattern using other parameters transmitted from the BS. For example, the pattern may be determined by a function having as input the total length of the NPDSCH.

The implementation of a low-cost and low-complexity UE is important in the MTC and/or NB-IoT system.

Thus, considering the memory and processing speed of the UE, it may be necessary to provide a sufficiently long time between different TBs. When different transmission carriers are used for different NPDSCHs and/or NPUSCHs or when UL and DL transmission are alternately performed as in cross-carrier scheduling and/or UL/DL interlacing, an additional time may be further required for retuning and/or switching at the UE.

To solve the above problems, the present disclosure proposes a method (Method 1-4) of determining a timing gap between transmission of sub-blocks. Although Method 1-4 is described based on the NPDSCH, this is merely for convenience of description. That is, the corresponding method may be extended and applied to the NPUSCH transmission, the interleaved-transmission of the NPDSCH and NPUSCH, or other control channels.

(Method 1-4)

When Method 1 is applied, a predetermined timing gap may be configured between sub-blocks. The timing gap may have multiple definitions and be applied differently depending on the definitions.

First, the timing gap may be configured to exist only between sub-blocks created from different NPDSCHs. However, when sub-blocks created from the same NPDSCH are consecutive (that is, when the BS continuously transmits the sub-blocks created from the same NPDSCH), no timing gap may be defined between the corresponding sub-blocks.

FIG. 31 illustrates a timing gap between sub-blocks to which the methods proposed in the present disclosure are applicable. FIG. 31 is merely for illustrative purposes, and the scope of the present disclosure is not limited thereto.

In FIG. 31, it is assumed that the BS schedules two NPDSCHs (L=2) for the UE. For example, the above-described timing gap may be configured between the sub-blocks of NPDSCH-1 (e.g., sub-block 1a and sub-block 1b) and the sub-blocks of NPDSCH-2 (e.g., sub-block 2a and sub-block 2b). That is, the timing gap may be configured when the NPDSCH to be received by the UE changes (for example, from NPDSCH-1 to NPDSCH-2 and/or from NPDSCH-2 to NPDSCH-1).

The timing gap may be configured only for a specific situation. For example, the specific situation may include an environment where the location of a frequency region for transmitting the sub-block (e.g., carrier, narrowband, etc.) is changed (e.g., frequency hopping), an environment where the NPDSCH transmission starts and the total number of transmitted sub-blocks is more than a specific threshold, and/or an environment where the NPDSCH transmission starts and the elapsed time is more than a specific threshold. Such a threshold may be predefined in the system or configured by the BS for the UE.

The specific situation may include an environment where the operation for early transmission termination at the BS and/or UE is configured. The operation for early transmission termination may refer to an operation in which the BS transmits a DL control channel for terminating UE's UL transmission before the end of the entire transmission and the UE receives the DL control channel or an operation in which the UE transmits a UL feedback channel for informing whether the UE succeeds in decoding before the end of the entire transmission and the BS receives the UL feedback channel.

The above-described timing gap may be defined as a minimum requirement. In some cases, the timing gap between sub-blocks may become larger than the configured one.

The BS may dynamically provide information on the timing gap to the UE through physical layer signaling (e.g., DCI). Alternatively, the BS may semi-statically configure or indicate the information on the timing gap through higher layer signaling (e.g., SIB, RRC signaling, etc.).

When Method 1-4 is applied, if the UE is in the idle state or if the NPDSCH is a common channel for multiple UEs, the size of the timing gap may have a cell-specific value. Meanwhile, when Method 1-4 is applied, if the UE is in the connected mode state or if the NPDSCH is a UE-specific channel for a specific UE, the size of the timing gap may have a UE-specific value or zero value.

In addition, a method of enabling the BS to determine whether to apply Method 1 may be considered. The purpose of the method is to allow the BS to autonomously determine the application of Method 1 in order to improve the transmission and reception performance or consider the application of the method adaptively depending on situations.

Considering the above issue, the present disclosure proposes a signaling method (Method 1-5) for enabling the UE to recognize whether Method 1 is applied when the application is determined by the BS. That is, how the BS informs the UE whether Method 1 is applied will be described in Method 1-5.

(Method 1-5)

When Method 1 is applied, the BS may provide enable/disable information on whether Method 1 is applied to the UE. In this case, Method 1-5 may be applied according to at least one of the following methods: Methods 1-5a to 1-5c. Methods 1-5a to 1-5c may be applied independently or in combination.

Method 1-5a)

The above-described enable/disable information may be explicitly indicated by higher layer signaling (e.g., SIB, RRC singling, etc.). That is, using a parameter (e.g., IE) of higher layer signaling, the BS may explicitly inform the UE whether the application of Method 1 is enabled or disabled According to Method 1-5a, the BS may determine whether Method 1 is applied depending on various situations so that it is advantageous in terms of network flexibility.

Method 1-5b)

When the multi-TB transmission is enabled, the application of Method 1 may also be enabled. On the contrary, when the multi-TB transmission is disabled, the application of Method 1 may also be disabled. In other words, whether Method 1 is applied may be determined depending on whether the multi-TB transmission is applied. When the system is capable of operating a plurality of multi-TB scheduling structures, whether the application of Method 1 is enabled or disabled may be determined by a multi-TB scheduling structure configured by the BS.

According to Method 1-5b, since there is no additional signaling, signaling overhead may be reduced, thereby simplifying UE operation.

Method 1-5c)

When the multi-TB transmission is enabled, whether Method 1 is enabled or disabled may be determined based on (or depending on) some of the parameters related to a physical channel transmission structure configured by higher layer signaling (e.g., SIB, RRC signaling, etc.). That is, the BS may transmits to the UE a parameter(s) related to the transmission structure of a specific physical channel through higher layer signaling, and the UE may be configured to recognize whether Method 1 is enabled or disabled based on the parameter(s).

In this case, the parameter may include a value(s) for determining the transmission length of the NPDCCH, NPUSCH, and/or NPDSCH. For example, when the maximum number of repetitions Rmax is more than or equal to a specific value, Method 1 may be enabled. Otherwise, Method 1 may be disabled. The reverse is also true.

Additionally or alternatively, the parameter may include the maximum number of configured HARQ processes. For example, when the maximum number of HARQ processes configured for the UE is more than or equal to a specific value, Method 1 may be enabled. Otherwise, Method 1 may be disabled. The reverse is true as well. The maximum number of HARQ processes may refer to the maximum number of HARQ processes that the BS and/or UE is capable of managing using a single DCI. Alternatively, the maximum number of HARQ processes may refer to the maximum number of different TBs manageable by a single DCI.

Additionally or alternatively, in the case of the MTC, the parameter may include information on CE mode. For example, Method 1 may be configured to be enabled in CE mode B and disabled in CE mode A, and vice versa.

Additionally or alternatively, in the case of the MTC, the parameter may include information on whether frequency hopping is applied. For example, when frequency hopping is enabled, Method 1 may be disabled. Otherwise, Method 1 may be enabled. The reverse is also true.

Additionally or alternatively, in the case of the NB-IoT, the parameter may include whether UL transmission is the single-tone transmission and/or SCS thereof. For example, when the UL transmission is the multi-tone transmission, Method 1 may be enabled. When the UL transmission is the single-tone transmission, Method 1 may be disabled. The reverse is also true. The corresponding method may be applied only to UL transmission, and the above condition may not be applied to DL transmission.

Additionally or alternatively, the parameter may include whether a gap configurable between TBs is enabled or disabled. The gap may be configured to improve time diversity or support HARQ-ACK transmission and/or DCI monitoring at the UE for early transmission termination. The gap may be different from a UL compensation gap for DL synchronization, which is used in the legacy NB-IoT, or a DL gap for scheduling of other channels. In addition, the gap may be applied only when the application thereof is enabled/disabled by the BS. For example, when the gap is enabled, Method 1 may be disabled. Otherwise, Method 1 may be disabled. The reverse is true as well.

According to Method 1-5c, whether Method 1 is applied may be determined by grasping an optimized transmission and reception method in advance based on the physical channel transmission structures, and thus the UE may determine the application of Method 1 without signaling overhead.

The above-described methods (Methods 1-5a to 1-5c) may be applied differently whenever transmission is performed. For example, the above-described methods may be applied differently to UL and DL. Additionally or alternatively, the methods may be applied differently to a data channel (i.e., traffic channel) and a control channel.

In the above-described methods, the term "enable/disable" may indicate whether Method 1 is applicable. Whether Method 1 is actually applied may be triggered by separate signaling (e.g., DCI).

Specifically, after determination of whether the above method is enabled or disabled based on Method 1-5, the application of the interleaved-transmission/reception on a sub-block basis, which is proposed in Method 1, may be trigged by DCI, etc. This operation may allow the BS to control the transmission according to Method 1 more dynamically. To this end, the present disclosure proposes a method of triggering the transmission and reception according to Method 1 based on DCI (Method 1-6).

(Method 1-6)

When Method 1 is applied as described above, the transmission and reception according to Method 1 may be triggered by DCI transmitted by the BS to the UE (e.g., DCI in step S2610 of FIG. 26, DCI in step S2710 of FIG. 27, and DCI in step S2810 of FIG. 28).

When Method 1 is triggered by the DCI, the UE may assume that Method 1 is applied to NPDSCH reception (or NPUSCH transmission), which is configured by the corresponding DCI. On the contrary, when Method 1 is not triggered by the DCI, the UE may assume that Method 1 is not applied to the NPDSCH reception (or NPUSCH transmission) configured by the corresponding DCI.

In this case, Method 1-6 may be applied according to at least one of the following methods: Methods 1-6a to 1-6c. In particular, Methods 1-6a to 1-6c may be applied independently or in combination.

Method 1-6a)

Whether Method 1 is triggered may be explicitly indicated by one bit (e.g., a flag bit) in a specific field of the DCI exchanged between the BS and UE. For example, when the BS transmits the DCI by setting a specific one bit in the DCI field to 1, it may mean that Method 1 is triggered. When the BS transmits the DCI by setting the corresponding bit to 0, it may mean that Method 1 is not triggered.

According to Method 1-6a, the BS may determine whether Method 1 is applied (or triggered) dynamically depending on various situations so that it is advantageous in terms of network flexibility.

Method 1-6b)

Whether Method 1 is triggered may be determined by a DCI format type transmitted and received between the BS and UE and an RNTI used for DCI reception. In addition, Method 1-6b may include when the usage or interpretation of the DCI field is changed by the flag bit even though the same DCI format is used.

According to Method 1-6b, when the UE expects multiple DCI formats or when the same DCI format is used for multiple purposes according to RNTIs, whether Method 1 is applied may be determined according to different DCI purposes.

Method 1-6c)

Whether Method 1 is triggered may be determined based on (or depending on) some of the parameters with different purposes, which exist in the DCI field exchanged between the BS and UE.

In this case, the parameter may include a repetition value for determining the transmission length of a physical channel. For example, when the repetition value is more than or equal to a specific value, Method 1 may be enabled. Otherwise, Method 1 may be disabled. The reverse is also true.

Additionally or alternatively, the parameter may include a TBS and/or a modulation and coding scheme (MCS) level. For example, Method 1 may be applied only to a specific portion of the table that determines the TBS/MCS.

Additionally or alternatively, the parameter may include the basic unit of the TB to be used and the size determined by a combination of repetition numbers applied to the TB. For example, whether Method 1 is triggered may be determined by the product of the number and repetition of time units (e.g., subframes, slots, symbols, etc.) used for transmitting one TB.

Additionally or alternatively, the parameter may include the number of actually used HARQ processes. For example, the number of actually used HARQ processes, which is configured by the DCI, is more than or equal to a specific value, Method 1 may be enabled. Otherwise, Method 1 may be disabled. The reverse is true. In this case, the HARQ process number may mean the number of different TBs configured by the DCI in a broad sense.

Additionally or alternatively, whether Method 1 is applied may be determined depending on whether an interval for repeatedly transmitting the same TB in the time domain under the application of Method 1 is more than or equal to a specific value. This may be determined by considering multiple parameters configured by the DCI. For example, Method 1 may be disabled when the same TBs, which are repeatedly transmitted, in the same HARQ process have no enough space to obtain time diversity in the time domain even though Method 1 is applied. Simply, when the above-described conditions are not satisfied since the number of times that a channel is repeated, which is indicated (or scheduled) by the DCI, is less than a specific value and/or when the indicated HARQ process number is less than a specific value, Method 1 may not be triggered. The reverse is also true.

Additionally or alternatively, in the case of the NB-IoT, the parameter may include a RU used for transmission and reception.

According to Method 1-6c, whether Method 1 is applied may be determined by the configured transmission type without extra signaling for control of Method 1.

Regarding the above-described methods (Methods 1-6a to 1-6c), it may be configured that when multiple DL and UL transmission are simultaneously triggered by one DCI, Method 1 is applied to allowed transmission thereamong.

Method of Supporting Early Transmission Termination in Consideration of Interleaved-Transmission/Reception of Multiple Physical Signals/Channels When a physical signal/channel is interleaved-transmitted/received on a sub-block basis, a new method by which the UE transmits HARQ ACK/NACK for the corresponding signal/channel needs to be considered. A HARQ process management method in consideration of the methods proposed in the present disclosure may need to be considered.

In the prior art (e.g., 3GPP Rel-14 NB-IoT), when the UE obtains grants for two NPDSCHs in two HARQ processes, transmission of one NPDSCH may start after completion of transmission of the other NPDSCH. In this case, the starting point of each of two NPDSCHs may be determined by a scheduling delay value indicated by each DCI, and it may not be changed in the meantime. In this case, if the UE succeeds in decoding the first NPDSCH before completing the reception of the corresponding NPDSCH, the BS may continue to transmit the first NPDSCH.

In this case, early transmission termination may be applied for latency reduction. The early transmission termination may mean that when the UE completes decoding of the NPDSCH before expiration of the duration of the corresponding NPDSCH, the UE informs the BS of the fact over a feedback channel, and the BS early terminates transmission of the corresponding NPDSCH upon receiving the feedback.

If the early transmission termination is applied to two HARQ processes of the conventional NB-IoT, the BS may early terminate the first NPDSCH transmission, thereby achieving overhead saving. However, the second NPDSCH transmission may have the following disadvantages: since the expected scheduling delay is applied as it is, there may be no latency reduction, or a separate control channel may be required to reduce the scheduling delay.

To solve the above problems, the present disclosure proposes a method (Method 2) of supporting early transmission termination in consideration of the NPDSCH transmission structure based on the sub-block structure proposed in Method 1. Although Method 2 is described based on the NPDSCH, this is merely for convenience of description. That is, the corresponding method may be extended and applied to the NPUSCH transmission, the interleaved-transmission of the NPDSCH and NPUSCH, or other control channels. In addition, although the description of Method 2 is made based on the assumption that a subframe is used as the transmission unit, the present disclosure is also applicable to other types of time-domain resource units (e.g., slot, symbol, etc.).

(Method 2)

When Method 1 is applied, ACK/NACK feedback (A/N feedback) for the NPDSCH(s) may be transmitted after N sub-blocks are transmitted.

In this case, the value of N may be dynamically indicated by physical layer signaling (e.g., DCI, etc.) or semi-statically configured or indicated by higher layer signaling (e.g., SIB, RRC signaling, etc.). That is, the BS may inform the UE of the value of N through the physical layer signaling and/or higher layer signaling.

The value of N may vary depending on situations. For example, the value of N may vary while a NPDSCH(s) triggered by specific DCI is transmitted. Additionally or alternatively, the value of N may be configured differently depending on whether the NPDSCH corresponding to the sub-block is retransmitted. Additionally or alternatively, the value of N may vary depending on the number of HARQ processes for which transmission is not transmitted at a specific time.

When Method 2 is applied, if a receiving end (e.g., BS or UE) succeeds in decoding of a corresponding physical channel, the receiving end may transmits ACK feedback. Otherwise, the receiving end may perform discontinuous transmission (DTX) where no feedback is transmitted.

For the A/N feedback, A/N bundling may be applied to L (multiple) HARQ processes. In this case, the UE may determine ACK only when succeeding in decoding all L NPDSCHs and transmit (or report) the ACK to the BS. When the UE fails in decoding one NPDSCH, the UE may determine NACK and transmit the NACK to the BS.

Alternatively, for the A/N feedback, A/N multiplexing may be applied to L (multiple) HARQ processes. In this case, the decoding results of L NPDSCHs may be multiplexed and transmitted using one signal and/or channel. That is, the UE may inform the BS whether the UE succeeds in decoding the L NPDSCHs through multiplexing on one signal and/or channel. Specifically, some of the decoding results of the L NPDSCHs may be bundled so that the decoding results may be expressed as P ACK/NACK groups (where P is less than L).

The above-described A/N feedback method may be configured differently depending on how the physical signal and/or channel is transmitted or received. For example, the A/N feedback method may be configured differently depending on whether frequency division duplexing (FDD) or time division duplexing (TDD) is used.

When Method 2 is applied to the FDD, the transmission timing of an A/N feedback channel may be configured in a gap period between sub-blocks. When the UE is configured to provide the A/N feedback after an n-th sub-block, an (n+1)-th sub-block may start after the A/N feedback is terminated.

Alternatively, when Method 2 is applied to the FDD, the transmission timing of the A/N feedback channel may be configured to overlap with that of the sub-block. The UE may be configured to start transmission of the A/N feedback corresponding to the n-th sub-block from the middle of the n-th sub-block and terminate the transmission before the start of the (n+1)-the sub-block. In addition, when the n-th sub-block and the (n+1)-th sub-block are configured to carry the same content repeatedly, the UE may transmit the A/N feedback for the n-th sub-block at the transmission timing of the (n+1)-th sub-block.

When Method 2 is applied to the TDD, the transmission timing of the A/N feedback may be configured using the duration of a time unit (e.g., subframe, slot, symbol, etc.) incapable of transmitting the sub-block. For example, in the TDD, the transmission timings of the A/N feedback and the NPDSCH sub-block may be interlaced based on a UL/DL configuration.

Figure 32:
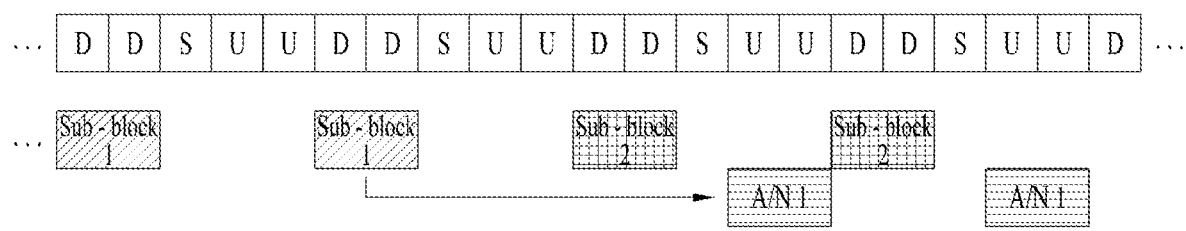
FIG. 32 illustrates an example of time positions of transmitting or receiving ACK/NACK feedbacks and sub-blocks to which the methods proposed in the present disclosure are applicable.

FIG. 32 illustrates the transmission and reception timings of A/N feedback and sub-blocks to which the methods proposed in the present disclosure are applicable.

Referring to FIG. 32, when the transmission timings of the sub-blocks of NPDSCH-1 and NPDSCH-2 are configured, the UE may be configured to transmit the A/N feedback in UL time units (e.g., UL subframes) according to a UL/DL configuration of the TDD.

When the A/N feedback is capable of being transmitted before completion of the NPDSCH (or NPUSCH) transmission as described in Method 2, the early transmission termination may be applied to sub-blocks of an NPDSCH (or NPUSCH) to be reported as ACK. Accordingly, the BS may reduce the overhead of the NPDSCH (or NPUSCH) of which the transmission is successful. In this case, resources scheduled for the NPDSCH (or NPUSCH) corresponding to the ACK feedback may be used for other purposes.

Figure 33:
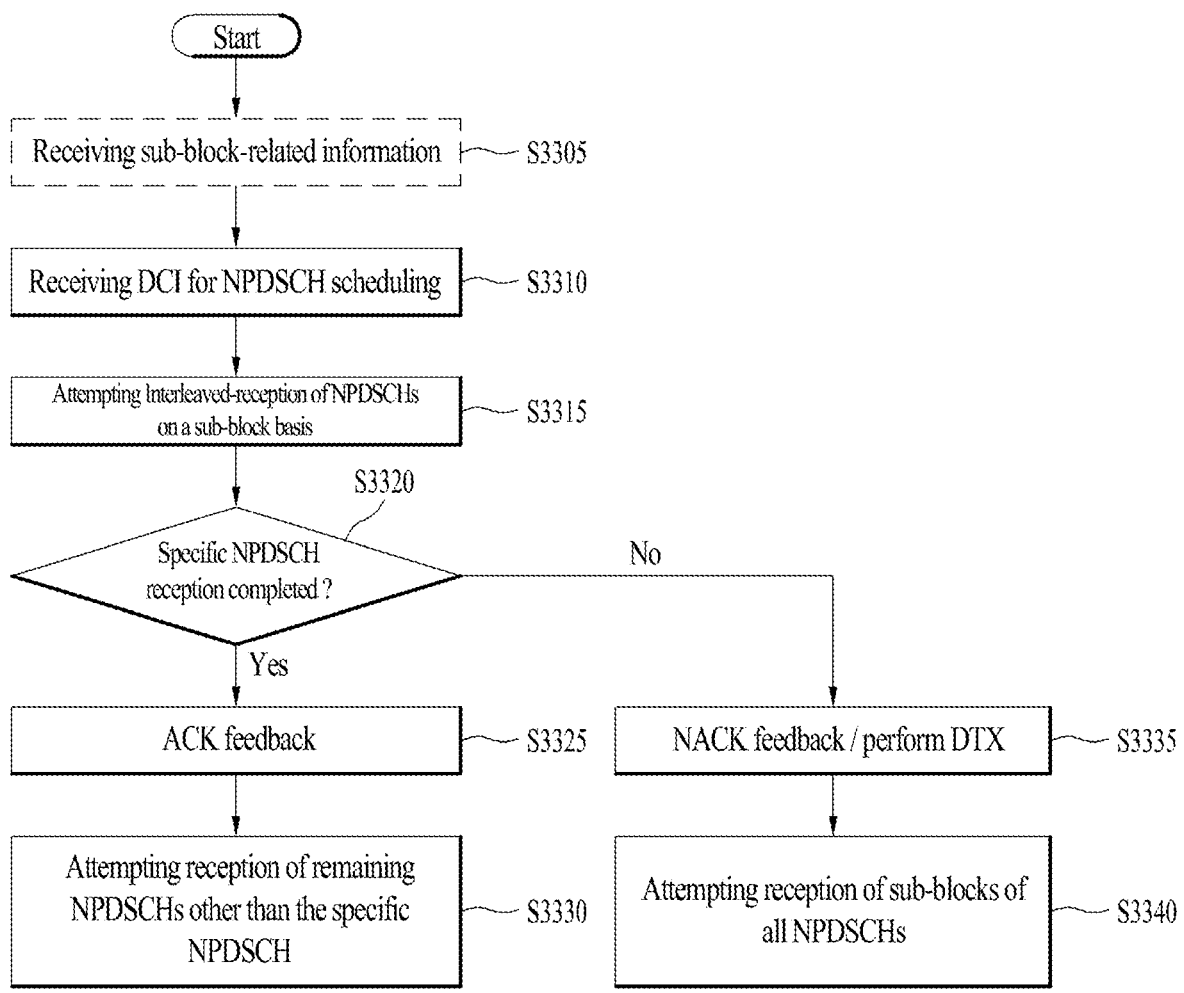
FIG. 33 illustrates an example of a flowchart for the UE operations in consideration of the early transmission termination to which the methods proposed in the present disclosure are applicable.
Figure 34:
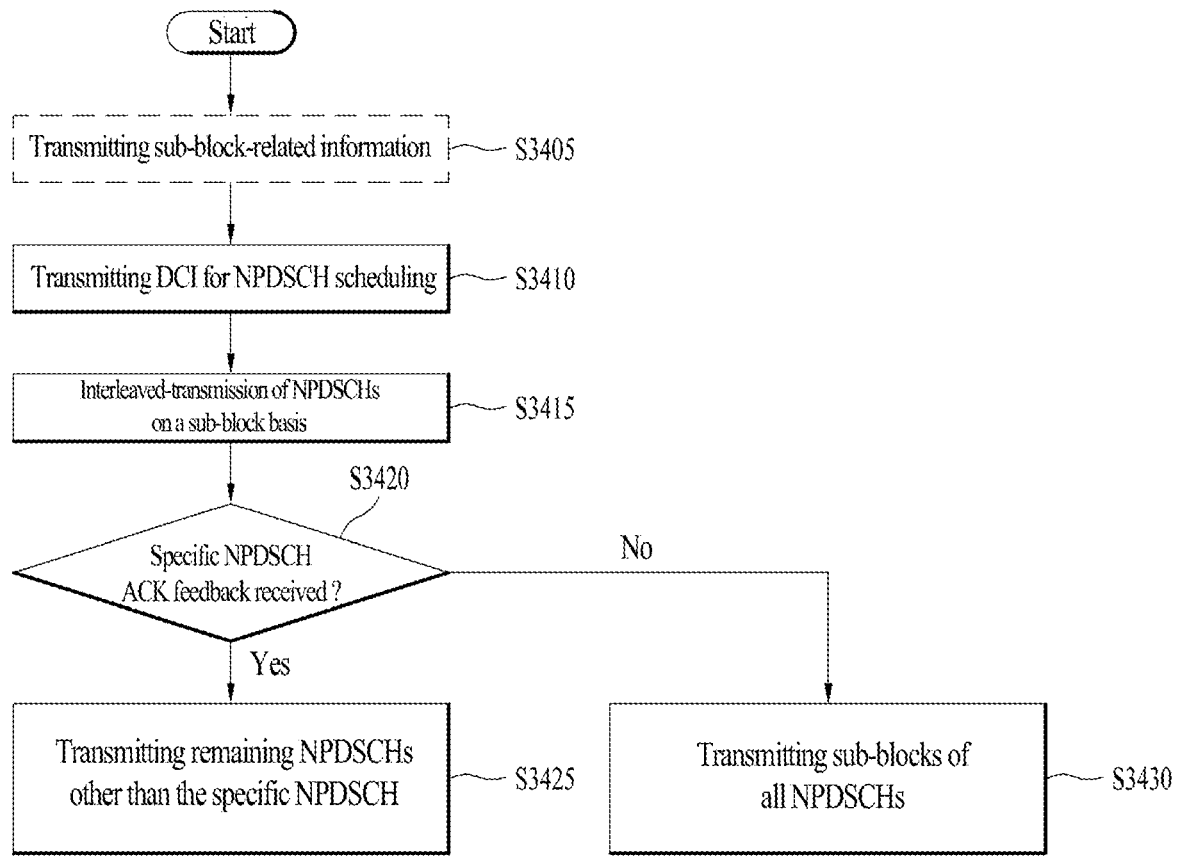
FIG. 34 illustrates an example of a flowchart for the BS operations in consideration of the early transmission termination to which the methods proposed in the present disclosure are applicable.

FIGS. 33 and 34 are flowcharts illustrating the operations of a UE and a BS related to the method of supporting the early transmission termination to which the methods proposed in the present disclosure are applicable. Similarly, although the descriptions of FIGS. 33 to 34 are made based on the NPDSCH, these are merely exemplary. That is, the corresponding methods may be extended and applied to the NPUSCH transmission, the interleaved-transmission of the NPDSCH and NPUSCH, or other control channels. Further, the operations illustrated in FIGS. 33 to 34 may be commonly applied to the methods proposed in the present disclosure.

FIG. 33 is a flowchart illustrating the UE operations in consideration of the early transmission termination to which the methods proposed in the present disclosure are applicable. FIG. 33 is merely for illustrative purposes, and the scope of the present disclosure is not limited thereto.

In FIG. 33, it is assumed that the UE supports the interleaved-transmission/reception on a sub-block basis based on Method 1. Since steps S3305, S3310, and S3315 of FIG. 33 may correspond to steps S2605, S2610, and S2615 of FIG. 26, respectively, the descriptions thereof will be skipped.

As described above, when the UE is scheduled with NPDSCH reception on a sub-block basis, the UE may be configured to attempt interleaved-reception of one or more NPDSCHs on a sub-block basis.

In this case, if the UE completes reception of a specific NPDSCH among the one or more configured NPDSCHs (S3320), the UE may transmit ACK feedback for the corresponding NPDSCH to the BS (S3325). For example, when the reception of NPDSCH-1 is completed in the second sub-block, the UE may transmit ACK to the BS at the feedback time configured for the corresponding sub-block. In this case, the UE may attempt to receive sub-blocks of the remaining NPDSCHs except the specific NPDSCH that is completely received (S3330). In other words, this may mean that the transmission of the specific NPDSCH is early terminated.

Meanwhile, if the UE does not complete the reception of the specific NPDSCH among the one or more configured NPDSCHs, that is, if the UE does not complete the reception of all the NPDSCHs (S3320), the UE may transmit NACK feedback for each of the NPDSCHs to the BS or perform DTX (S3335). In this case, the UE may continue to attempt to receive sub-blocks of all NPDSCHs (S3340). In other words, when the UE transmits no ACK feedback for any NPDSCHS, the UE may be configured to continue to attempt to receive all the configured NPDSCHs.

The device shown in FIG. 11 and/or FIG. 36 may be used to implement the corresponding UE. Accordingly, the operation of each step illustrated in FIG. 33 may be performed by the UE device shown in FIG. 11 and/or FIG. 36.

FIG. 34 is a flowchart illustrating the BS operations in consideration of the early transmission termination to which the methods proposed in the present disclosure are applicable. FIG. 34 is merely for illustrative purposes, and the scope of the present disclosure is not limited thereto.

In FIG. 34, it is assumed that the BS supports the interleaved-transmission/reception on a sub-block basis based on Method 1. Since steps S3405, S3410, and S3415 of FIG. 34 may correspond to steps S2705, S2710, and S2715 of FIG. 27, respectively, the descriptions thereof will be skipped.

As described above, when the BS schedules NPDSCH reception on a sub-block basis for the UE, the BS may be configured to perform interleaved-transmission of one or more NPDSCHs on a sub-block basis.

In this case, if the BS receives from the UE ACK feedback indicating that a specific NPDSCH among the one or more NPDSCHs is completely received (S3420), the BS may stop transmitting sub-blocks of the corresponding NPDSCH to the UE and transmit only sub-blocks of the remaining NPDSCHs (S3425). For example, when the BS receives from the UE ACK feedback indicating that the reception of NPDSCH-1 is completed in the second sub-block, the BS may transmit only sub-blocks of the remaining NPDSCHs except the specific NPDSCH that is completely received. In other words, this may mean that the transmission of the specific NPDSCH is early terminated.

Meanwhile, if the BS does not receive from the UE the ACK feedback indicating that the specific NPDSCH among the one or more NPDSCHs is completely received (S3420), the BS may transmit sub-blocks of all the configured NPDSCHs to the UE (S3430). In other words, when the BS receives no ACK feedback for any NPDSCHs, the BS may transmit to the UE the sub-blocks of all NPDSCHs configured for the UE.

The device shown in FIG. 11 and/or FIG. 36 may be used to implement the corresponding BS. Accordingly, the operation of each step illustrated in FIG. 34 may be performed by the BS device shown in FIG. 11 and/or FIG. 36.

To obtain a latency gain at the UE in a structure to which Method 2 is applicable, the present disclosure proposes a method (Method 2-1) of adaptively determining a configuration for sub-block transmission. Although Method 2-1 is described based on the NPDSCH, this is merely for convenience of description. That is, the corresponding method may be extended and applied to the NPUSCH transmission, the interleaved-transmission of the NPDSCH and NPUSCH, or other control channels.

(Method 2-1)

When Method 2 is applied, the BS may adaptively determine a configuration for transmitting the remaining sub-blocks based on A/N feedback information from the UE.

In this case, when the A/N feedback from the UE is interpreted as NACK information or when it is determined that the UE transmits no A/N feedback, the BS may determine to use the configuration of the sub-block transmission, which has been used before the occurrence of a corresponding A/N feedback channel, without any change. On the other hand, when the A/N feedback from the UE is interpreted as ACK information, the BS may stop transmitting sub-blocks of an NPDSCH indicated by the ACK information.

For example, when two HARQ processes are used, if ACK feedback is provided for NPDSCH-1 (or NPDSCH-2) and no ACK feedback is provided for NPDSCH-2 (or NPDSCH-1), the sub-blocks of NPDSCH-2 (or NPDSCH-1) may be configured to be transmitted in next transmission.

In this case, the transmission timings of the sub-blocks of NPDSCH-2 (or NPDSCH-1) may be adjusted for latency reduction. Specifically, the transmission timings of the sub-blocks of NPDSCH-2 (or NPDSCH-1) may be set to those of NPDSCH-1 (or NPDSCH-2), which were scheduled when grants were received by DCI.

In addition, the BS may stop the transmission of the sub-blocks of the NPDSCH indicated by the ACK information after lapse of a specific time (e.g., t0) from the ACK transmission.

Figure 35A:
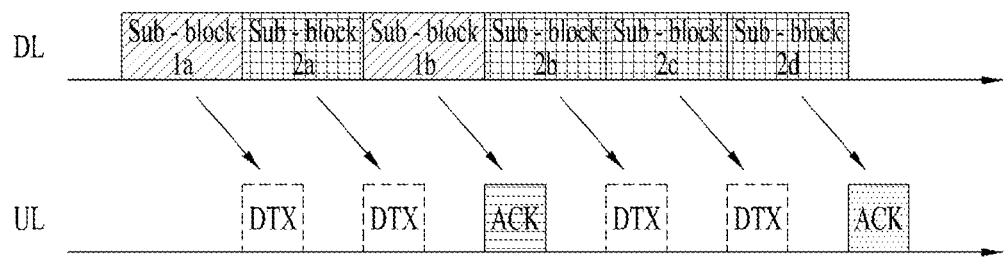
FIGS. 35A and 35B illustrate examples of A/N feedbacks for transmissions on a sub-block basis to which the methods proposed in the present disclosure are applicable.
Figure 35B:
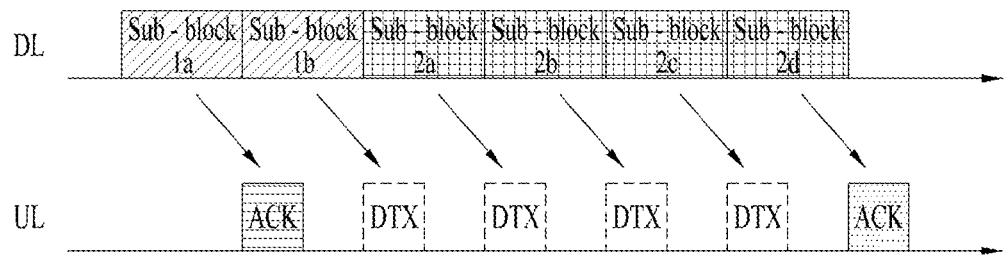

FIGS. 35A and 35B illustrate examples of A/N feedback for transmission on a sub-block basis to which the methods proposed in the present disclosure are applicable. FIGS. 35A and 35B are merely for illustrative purposes, and the scope of the present disclosure is not limited thereto.

In FIGS. 35A and 35B, it is assumed that the operations described in Method 2-1 are applied.

FIG. 35A illustrates a case in which when a UE is scheduled with two NPDSCHs, the corresponding UE succeeds in decoding NPDSCH-1 after receiving sub-block 1b and then transmits ACK information therefor to a BS. Upon receiving the ACK, the BS may determine that transmission of information on NPDSCH-1 is no longer necessary and then transmit only NPDSCH-2 in next transmission.

FIG. 35B illustrates a case in which when a UE is scheduled with two NPDSCHs, the corresponding UE succeeds in decoding NPDSCH-1 after receiving sub-block 1a and then transmits ACK information therefor to a BS. Upon receiving the ACK, the BS may determine that transmission of information on NPDSCH-1 is no longer necessary and then transmit only NPDSCH-2 in next transmission. However, considering the processing time of the BS and/or UE, the sub-block scheduling structure may be configured not to be changed during a specific time period (e.g., t0 time period).

To obtain a latency gain at the UE in a structure to which Method 2 is applicable, the present disclosure proposes a method (Method 2-2) of adaptively determining a configuration for sub-block transmission. In contrast to Method 2-1, Method 2-2 is described based on the NPUSCH. However, this is merely for convenience of description, and the corresponding method may be extended and applied to the NPDSCH transmission, the interleaved-transmission of the NPDSCH and NPUSCH, or other control channels.

(Method 2-2)

When Method 2 is applied to the NPUSCH transmission, the UE may adaptively determine a configuration for transmitting the remaining sub-blocks based on rescheduling grant information transmitted by the BS. That is, the rescheduling grant may allow the UE to stop transmission of sub-blocks of a specific NPUSCH and adaptively configure transmission of sub-blocks of the remaining NPUSCH(s).

The above rescheduling grant may be transmitted in the form of DCI. In this case, the corresponding DCI may be configured in the form of compact DCI, which has a small size compared to DCI for scheduling initial multi-HARQ. When the compact DCI is repeated, the number of times that the compact DCI is repeated may be defined as a function of the number of times that the DCI for scheduling the initial multi-HARQ is repeated.

When there is a separate A/N feedback channel, the UE may be configured not to determine the configuration for transmitting the remaining sub-blocks adaptively before receiving the rescheduling grant even though the UE receives ACK for the transmission of the specific NPUSCH.

When the adjustment of transmission scheduling of sub-blocks is determined as described in Method 2-1 and/or Method 2-2, if bundling and/or multiplexing is applied to A/N feedback, the size of the bundling and/or multiplexing applied to the A/N feedback may be changed after transmission of some NPDSCHs (or NPUSCHs) is completed. In this case, the format of an A/N feedback channel suitable for necessary A/N bits may need to be adaptively determined together to provide more efficient A/N feedback.

To this end, the present disclosure proposes a method (Method 2-3) of adaptively configuring an A/N feedback channel format in consideration of the adaptive sub-block transmission configuration proposed in Method 2-1 and/or Method 2-2. Although Method 2-3 is described based on the NPDSCH, this is merely for convenience of description. That is, the corresponding method may be extended and applied to the NPUSCH transmission, the interleaved-transmission of the NPDSCH and NPUSCH, or other control channels.

(Method 2-3)

When Method 2-1 and/or Method 2-2 is applied, the UE may adaptively determine transmission of an A/N feedback channel based on the adaptively determined sub-block transmission configuration and then transmit the determined A/N feedback channel.

In this case, the A/N feedback channel transmission method may include an A/N feedback channel format. In addition, the corresponding format may be determined by considering the size of A/N feedback bits to be transmitted by the UE.

Moreover, the A/N feedback channel transmission method may include the repetition level (i.e., repetition number) of the A/N feedback channel.

When the transmission scheduling of sub-blocks is adaptively adjusted as described in Method 2-1 and/or Method 2-2, the UE and/or BS may need to recognize that the transmission scheduling is adaptively adjusted. To this end, the BS may reschedule the configuration of the sub-block transmission by configuring an additional control channel. However, in this case, overhead for transmitting the additional control channel, delay caused by the time required to transmit and receive the additional control channel, and/or UE power consumption for decoding the additional control channel may occur.

To solve the above problems, the present disclosure proposes a method (Method 3) of managing a HARQ process ID using additional information included in the NPDSCH. Although Method 3 is described based on the NPDSCH, this is merely for convenience of description. That is, the corresponding method may be extended and applied to the NPUSCH transmission, the interleaved-transmission of the NPDSCH and NPUSCH, or other control channels.

(Method 3)

When multiple HARQ processes (e.g., L HARQ processes) are used, L NPDSCHs may include additional information capable of identifying each of the NPDSCHs. For example, the additional information may be represented by a CRC masking value. Additionally or alternatively, the additional information may be represented by an RS.

In this case, the additional information may be determined by a HARQ process ID. Accordingly, the UE may check the HARQ process ID from the additional information obtained by receiving the NPDSCH.

FIG. 36 illustrates block diagrams of wireless communication apparatuses to which the methods proposed by the present disclosure are applicable.

Referring to FIG. 36, a wireless communication system comprises a base station 3610 and several user equipments (UEs) 3620 located in the region of the base station. For example, the base station and the UE shown in FIG. 36 may be wireless communication apparatuses represented by simplifying the above-described wireless communication apparatuses (e.g., base station 1110 and UE 1120 of FIG. 11).

Each of the base station and the UE may be referred to as a wireless device.

The base station comprises a processor 3611, a memory 3612, and a radio frequency (RF) module 3613. The processor 3611 implements functions, procedures, and/or methods proposed by the above-described methods of the present disclosure. Protocol layers of wireless interface may be implemented by the processor. The memory is coupled to the processor, and stores various information for operating the processor. The RF module is coupled to the processor, and transmits and/or receives a wireless signal.

The UE comprises a processor 3621, a memory 3622, and a RF module 3623.

The processor implements functions, procedures, and/or methods proposed by the above-described methods of the present disclosure. Protocol layers of wireless interface may be implemented by the processor. The memory is coupled to the processor, and stores various information for operating the processor. The RF module is coupled to the processor, and transmits and/or receives a wireless signal.

The memory 3612, 3622 may be inside or outside of the processor 3611, 3621, and may be coupled to the processor by the well-known various means.

Further, the base station and/or the UE may have a single antenna or multiple antennas.

The antenna(s) 3614, 3624 perform functions for transmitting and receiving a wireless signal.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

For example, the present disclosure may be implemented a device or apparatus in the form of a system on chip (SOC). The device or apparatus may be equipped in the UE or the base station, and may comprise a memory and a processor. The memory stores instructions or executable codes and is operatively connected to the processor. The processor is coupled to the memory and may be configured to implement the operations including the methods in accordance to the present disclosure when executing the instructions or executable codes stored in the memory.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

Although schemes of performing uplink transmissions in the wireless communication system of the present disclosure are described focusing on the examples applied to the 3GPP LTE/LTE-A system/5G system (New RAT system), the present disclosure can be applied to various wireless communication systems.

What is claimed is:

1. A method for receiving a signal by a user equipment (UE) in a wireless communication system, the method comprising:
   receiving, from a base station, a single downlink control information (DCI) that schedules a plurality of physical downlink shared channel (PDSCH) transmission blocks; and
   receiving, based on the DCI and from the base station, the plurality of PDSCH transmission blocks,
   wherein each PDSCH transmission block is repeated within a time duration comprising 'N' subunits each having a fixed time length in a time domain, where 'N' is a value determined based on the DCI,
   wherein the UE receives the plurality of PDSCH transmission blocks by interleaving the subunits of the plurality of PDSCH transmission blocks in the time domain,
   wherein a repeated reception for each PDSCH transmission block is configured,
   wherein the interleaving and the repeated reception are performed based on one pattern from among a plurality of patterns configured for the interleaving, and
   wherein the plurality of patterns includes:
      a first pattern of interleaving in which none of the 'N' subunits of a same PDSCH transmission block is consecutive in the time domain; and
      a second pattern of interleaving in which at least a part of the 'N' subunits of the same PDSCH transmission block is consecutive in the time domain,
      wherein a first total number of the plurality of PDSCH transmission blocks is supported for the first pattern, a second total number of the plurality of PDSCH transmission blocks is supported for the second pattern, and the first total number is different from the second total number.

2. The method of claim 1, wherein a number of consecutive subunits for the second pattern of interleaving is determined based on radio resource control (RRC) signaling.

3. The method of claim 1, further comprising:
   transmitting, to the base station, acknowledgement/negative-acknowledgement (ACK/NACK) information for the plurality of PDSCH transmission blocks; and
   receiving remaining PDSCH transmission blocks other than a PDSCH transmission block, for which ACK information has been transmitted among the plurality of PDSCH transmission blocks.

4. The method according to claim 1, wherein receiving the plurality of PDSCH transmission blocks comprises:
   receiving one of subunits of a first PDSCH transmission block at a first transmission time interval (TTI);
   receiving one of subunits of a second PDSCH transmission block at a second TTI after the first TTI; and
   receiving another one of the subunits of the first PDSCH transmission block at a third TTI after the second TTI.

5. A non-transitory processor readable medium recorded thereon instructions for performing the method according to claim 1.

6. A method for receiving a signal by a user equipment (UE) in a wireless communication system, the method comprising:
   receiving, from a base station, a single downlink control information (DCI) that schedules a plurality of physical downlink shared channels (PDSCHs), wherein each of the plurality of PDSCHs is repeatedly transmitted within a block of time, the block of time comprising a plurality of sub-blocks in a time domain; and
   receiving, based on the DCI and from the base station, the plurality of PDSCHs by interleaving the sub-blocks of the plurality of PDSCHs in the time domain,
   wherein a plurality of patterns for the interleaved and repeated reception are preconfigured, the interleaved and repeated reception is performed based on one pattern among the plurality of patterns, and the one pattern is determined by a function of a total length of the plurality of PDSCHs.

7. A device for wireless communication, the device comprising:
   a memory including executable codes; and
   a processor operatively connected to the memory,
   wherein the processor is configured to, when executing the executable codes, perform operations comprising:
   receiving, from a base station, a single downlink control information (DCI) that schedules a plurality of physical downlink shared channel (PDSCH) transmission blocks; and
   receiving, based on the DCI and from the base station, the plurality of PDSCH transmission blocks,
   wherein each PDSCH transmission block is repeated within a time duration comprising 'N' subunits each having a fixed time length in a time domain, where 'N' is a value determined based on the DCI,
   wherein the processor receives the plurality of PDSCH transmission blocks by interleaving the subunits of the plurality of PDSCH transmission blocks in the time domain,
   wherein a repeated reception for each PDSCH transmission block is configured,
   wherein the interleaving and the repeated reception are performed based on one pattern from among a plurality of patterns configured for the interleaving, and
   wherein the plurality of patterns includes:
      a first pattern of interleaving in which none of the 'N' subunits of a same PDSCH transmission block is consecutive in the time domain; and
      a second pattern of interleaving in which at least a part of the 'N' subunits of the same PDSCH block is consecutive in the time domain,
      wherein a first total number of the plurality of PDSCH transmission blocks is supported for the first pattern, a second total number of the plurality of PDSCH transmission blocks is supported for the second pattern, and the first total number is different from the second total number.

8. A method for transmitting a signal by a base station in a wireless communication system, the method comprising:

transmitting a single downlink control information (DCI) that schedules a plurality of physical downlink shared channel (PDSCH) transmission blocks; and transmitting the plurality of PDSCH transmission blocks, wherein each PDSCH transmission block is repeated within a time duration comprising 'N' subunits each having a fixed time length in a time domain, where 'N' is a value determined based on the DCI, wherein the base station transmits the plurality of PDSCH transmission blocks by interleaving the subunits of the plurality of PDSCH blocks in a time domain, wherein a repeated transmission for each PDSCH transmission block is configured, wherein the interleaving and the repeated transmission are performed based on one pattern from among a plurality of patterns configured for the interleaving, and wherein the plurality of patterns includes:

a first pattern of interleaving in which none of the 'N' subunits of a same PDSCH transmission block is consecutive in the time domain; and a second pattern of interleaving in which at least a part of the 'N' subunits of the same PDSCH transmission block is consecutive in the time domain, wherein a first total number of the plurality of PDSCH transmission blocks is supported for the first pattern, a second total number of the plurality of PDSCH transmission blocks is supported for the second pattern, and the first total number is different from the second total number.

9. A base station, comprising:

a transceiver; and a processor configured to perform operations comprising:

transmitting a single downlink control information (DCI) that schedules a plurality of physical downlink shared channel (PDSCH) transmission blocks, and transmitting the plurality of PDSCH transmission blocks, wherein each PDSCH transmission block is repeated within a time duration comprising 'N' subunits each having a fixed time length in a time domain, where 'N' is a value determined based on the DCI, wherein the plurality of PDSCH transmission blocks are transmitted by interleaving the subunits of the plurality of PDSCH transmission blocks in a time domain, wherein a repeated transmission for each PDSCH transmission block is configured, wherein the interleaving and the repeated transmission are performed based on one pattern from among a plurality of patterns configured for the interleaving, and wherein the plurality of patterns includes:

a first pattern of interleaving in which none of the 'N' subunits of a same PDSCH transmission block is consecutive in the time domain; and a second pattern of interleaving in which at least a part of the 'N' subunits of the same PDSCH transmission block is consecutive in the time domain, wherein a first total number of the plurality of PDSCH transmission blocks is supported for the first pattern, a second total number of the plurality of PDSCH transmission blocks is supported for the second pattern, and the first total number is different from the second total number.

\* \* \* \* \*